(12) United States Patent
Fleck et al.

(10) Patent No.: US 9,807,381 B2
(45) Date of Patent: Oct. 31, 2017

(54) IMAGING STRUCTURE EMITTER CALIBRATION

(71) Applicant: Microsoft Technology Licensing, LLC, Redmond, WA (US)

(72) Inventors: Rod G. Fleck, Bellevue, WA (US); David D. Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/432,756

(22) Filed: Feb. 14, 2017

(65) Prior Publication Data

US 2017/0163977 A1    Jun. 8, 2017

Related U.S. Application Data

(63) Continuation of application No. 13/420,388, filed on Mar. 14, 2012, now Pat. No. 9,578,318.

(51) Int. Cl.
| | |
|---|---|
| *H04N 7/18* | (2006.01) |
| *H04N 13/04* | (2006.01) |
| *G02B 27/01* | (2006.01) |
| *G02B 26/08* | (2006.01) |
| *H04N 13/02* | (2006.01) |

(52) U.S. Cl.
CPC ..... *H04N 13/0484* (2013.01); *G02B 26/0833* (2013.01); *G02B 27/0172* (2013.01); *H04N 13/0296* (2013.01); *H04N 13/044* (2013.01); *H04N 13/0459* (2013.01); *G02B 2027/014* (2013.01); *G02B 2027/0132* (2013.01)

(58) Field of Classification Search
CPC ........... H04N 13/0484; H04N 13/0296; H04N 13/044; H04N 13/0459; G02B 26/0833; G02B 27/0172; G02B 2027/0132; G02B 2027/014
See application file for complete search history.

(56) References Cited

U.S. PATENT DOCUMENTS

| | | | |
|---|---|---|---|
| 3,410,774 | A | 11/1968 | Barson et al. |
| 3,836,258 | A | 9/1974 | Courten et al. |
| 3,906,528 | A | 9/1975 | Johnson |
| 3,971,065 | A | 7/1976 | Bayer |

(Continued)

FOREIGN PATENT DOCUMENTS

| | | |
|---|---|---|
| AU | 2011204946 | 12/2011 |
| CN | 1440513 | 9/2003 |

(Continued)

OTHER PUBLICATIONS

"Advisory Action", U.S. Appl. No. 13/428,879, dated Sep. 19, 2014, 3 pages.

(Continued)

*Primary Examiner* — Nhon Diep

(57) ABSTRACT

In embodiments of imaging structure emitter calibration, an imaging unit includes an emitter structure that direct emits light, and optics direct the light along a light path in the imaging unit to illuminate a projection surface. A reflective panel reflects a portion of the light to illuminate a light sensor. An imaging application receives the sensor data from the light sensor, where the sensor data corresponds to emitted light output from the emitter structure. The imaging application can then initiate a calibration input to the emitter structure to adjust the emitted light output from the emitter structure.

20 Claims, 6 Drawing Sheets

(56) References Cited

U.S. PATENT DOCUMENTS

| | | |
|---|---|---|
| 4,711,512 A | 12/1987 | Upatnieks |
| 4,822,145 A | 4/1989 | Staelin |
| 4,860,361 A | 8/1989 | Sato et al. |
| 4,957,351 A | 9/1990 | Shioji |
| 5,019,808 A | 5/1991 | Prince et al. |
| 5,146,355 A | 9/1992 | Prince et al. |
| 5,252,950 A | 10/1993 | Saunders et al. |
| 5,309,169 A | 5/1994 | Lippert |
| 5,359,444 A | 10/1994 | Piosenka et al. |
| 5,453,877 A | 9/1995 | Gerbe et al. |
| 5,455,458 A | 10/1995 | Quon et al. |
| 5,455,601 A | 10/1995 | Ozaki |
| 5,455,882 A | 10/1995 | Veligdan |
| 5,459,611 A | 10/1995 | Bohn et al. |
| 5,483,307 A | 1/1996 | Anderson |
| 5,491,580 A | 2/1996 | O'Meara |
| 5,543,588 A | 8/1996 | Bisset et al. |
| 5,574,473 A | 11/1996 | Sekiguchi |
| 5,579,830 A | 12/1996 | Giammaruti |
| 5,583,609 A | 12/1996 | Mizutani et al. |
| 5,606,455 A | 2/1997 | Eichenlaub |
| 5,614,941 A | 3/1997 | Hines |
| 5,648,643 A | 7/1997 | Knowles et al. |
| 5,651,414 A | 7/1997 | Suzuki et al. |
| 5,673,146 A | 9/1997 | Kelly |
| 5,708,449 A | 1/1998 | Heacock et al. |
| 5,714,967 A | 2/1998 | Okamura et al. |
| 5,737,171 A | 4/1998 | Buller et al. |
| 5,751,476 A | 5/1998 | Matsui et al. |
| 5,771,320 A | 6/1998 | Stone |
| 5,777,715 A | 7/1998 | Kruegle et al. |
| 5,856,842 A | 1/1999 | Tedesco |
| 5,861,931 A | 1/1999 | Gillian et al. |
| 5,886,822 A | 3/1999 | Spitzer |
| 5,940,149 A | 8/1999 | Vanderwerf |
| 5,959,664 A | 9/1999 | Woodgate |
| 5,982,553 A | 11/1999 | Bloom et al. |
| 5,991,087 A | 11/1999 | Rallison |
| 6,101,008 A | 8/2000 | Popovich |
| 6,144,439 A | 11/2000 | Carollo |
| 6,160,667 A | 12/2000 | Smoot |
| 6,188,427 B1 | 2/2001 | Anderson et al. |
| 6,226,178 B1 | 5/2001 | Broder et al. |
| 6,239,502 B1 | 5/2001 | Grewe et al. |
| 6,264,787 B1 | 7/2001 | Burbank |
| 6,271,808 B1 | 8/2001 | Corbin |
| 6,307,142 B1 | 10/2001 | Allen et al. |
| 6,323,970 B1 | 11/2001 | Popovich |
| 6,377,401 B1 | 4/2002 | Bartlett |
| 6,411,512 B1 | 6/2002 | Mankaruse et al. |
| 6,446,442 B1 | 9/2002 | Batchelor et al. |
| 6,466,198 B1 | 10/2002 | Feinstein |
| 6,470,289 B1 | 10/2002 | Peters et al. |
| 6,481,851 B1 | 11/2002 | McNelley et al. |
| 6,496,218 B2 | 12/2002 | Takigawa et al. |
| 6,529,331 B2 | 3/2003 | Massof et al. |
| 6,542,307 B2 | 4/2003 | Gleckman et al. |
| 6,545,650 B1 | 4/2003 | Yamada et al. |
| 6,547,416 B2 | 4/2003 | Pashley et al. |
| 6,554,428 B2 | 4/2003 | Fergason et al. |
| 6,567,101 B1 | 5/2003 | Thomas |
| 6,577,411 B1 | 6/2003 | David |
| 6,580,529 B1 | 6/2003 | Amitai et al. |
| 6,606,152 B2 | 8/2003 | Littau |
| 6,621,702 B2 | 9/2003 | Elias et al. |
| 6,631,755 B1 | 10/2003 | Kung et al. |
| 6,635,999 B2 | 10/2003 | Belliveau |
| 6,639,201 B2 | 10/2003 | Almogy et al. |
| 6,735,499 B2 | 5/2004 | Ohki et al. |
| 6,753,828 B2 | 6/2004 | Tuceryan et al. |
| 6,775,460 B2 | 8/2004 | Steiner et al. |
| 6,804,115 B2 | 10/2004 | Lai |
| 6,809,925 B2 | 10/2004 | Belady et al. |
| 6,825,987 B2 | 11/2004 | Repetto et al. |
| 6,829,095 B2 | 12/2004 | Amitai |
| 6,867,753 B2 | 3/2005 | Chinthammit et al. |
| 6,888,613 B2 | 5/2005 | Robins et al. |
| 6,889,755 B2 | 5/2005 | Zuo et al. |
| 6,906,901 B1 | 6/2005 | Liu |
| 6,919,867 B2 | 7/2005 | Sauer |
| 6,947,020 B2 | 9/2005 | Kiser et al. |
| 6,964,731 B1 | 11/2005 | Krisko et al. |
| 6,971,443 B2 | 12/2005 | Kung et al. |
| 6,992,738 B2 | 1/2006 | Ishihara et al. |
| 6,997,241 B2 | 2/2006 | Chou et al. |
| 7,006,215 B2 | 2/2006 | Hoff et al. |
| 7,015,876 B1 | 3/2006 | Miller |
| 7,048,385 B2 | 5/2006 | Beeson et al. |
| 7,069,975 B1 | 7/2006 | Haws et al. |
| 7,113,605 B2 | 9/2006 | Rui et al. |
| 7,116,555 B2 | 10/2006 | Kamath et al. |
| 7,184,615 B2 | 2/2007 | Levola |
| 7,191,820 B2 | 3/2007 | Chou et al. |
| 7,193,584 B2 | 3/2007 | Lee et al. |
| 7,250,930 B2 | 7/2007 | Hoffman et al. |
| 7,261,453 B2 | 8/2007 | Morejon et al. |
| 7,271,795 B2 | 9/2007 | Bradski |
| 7,277,282 B2 | 10/2007 | Tate |
| 7,301,587 B2 | 11/2007 | Uehara et al. |
| 7,337,018 B2 | 2/2008 | Espinoza-Ibarra et al. |
| 7,359,420 B2 | 4/2008 | Shchegrov et al. |
| 7,365,734 B2 | 4/2008 | Fateh et al. |
| 7,369,101 B2 | 5/2008 | Sauer et al. |
| 7,376,852 B2 | 5/2008 | Edwards |
| 7,396,133 B2 | 7/2008 | Burnett et al. |
| 7,412,306 B2 | 8/2008 | Katoh et al. |
| 7,416,017 B2 | 8/2008 | Haws et al. |
| 7,417,617 B2 | 8/2008 | Eichenlaub |
| 7,418,170 B2 | 8/2008 | Mukawa et al. |
| 7,428,001 B2 | 9/2008 | Schowengerdt et al. |
| 7,430,349 B2 | 9/2008 | Jones |
| 7,430,355 B2 | 9/2008 | Heikenfeld et al. |
| 7,455,102 B2 | 11/2008 | Cheng |
| 7,505,269 B1 | 3/2009 | Cosley et al. |
| 7,513,627 B2 | 4/2009 | Larson et al. |
| 7,515,143 B2 | 4/2009 | Keam et al. |
| 7,542,665 B2 | 6/2009 | Lei |
| 7,551,814 B1 | 6/2009 | Smits |
| 7,576,916 B2 | 8/2009 | Amitai |
| 7,583,327 B2 | 9/2009 | Takatani |
| 7,607,111 B2 | 10/2009 | Vaananen et al. |
| 7,619,895 B1 | 11/2009 | Wertz et al. |
| 7,631,687 B2 | 12/2009 | Yang |
| 7,646,606 B2 | 1/2010 | Rytka et al. |
| 7,649,594 B2 | 1/2010 | Kim et al. |
| 7,660,500 B2 | 2/2010 | Konttinen et al. |
| 7,679,641 B2 | 3/2010 | Lipton et al. |
| 7,693,292 B1 | 4/2010 | Gross et al. |
| 7,701,716 B2 | 4/2010 | Blanco, Jr. et al. |
| 7,719,769 B2 | 5/2010 | Sugihara et al. |
| 7,768,534 B2 | 8/2010 | Pentenrieder et al. |
| 7,777,944 B2 | 8/2010 | Ho et al. |
| 7,817,104 B2 | 10/2010 | Ryu et al. |
| 7,832,885 B2 | 11/2010 | Hsiao et al. |
| 7,843,691 B2 | 11/2010 | Reichert et al. |
| 7,868,300 B2 | 1/2011 | Kruit et al. |
| 7,894,613 B1 | 2/2011 | Ong et al. |
| 7,903,409 B2 | 3/2011 | Patel et al. |
| 7,909,958 B2 | 3/2011 | Washburn et al. |
| 7,941,231 B1 | 5/2011 | Dunn |
| 7,986,462 B2 | 7/2011 | Kobayashi et al. |
| 8,004,621 B2 | 8/2011 | Woodgate et al. |
| 8,033,709 B2 | 10/2011 | Kao et al. |
| 8,046,616 B2 | 10/2011 | Edwards |
| 8,061,411 B2 | 11/2011 | Xu et al. |
| 8,085,948 B2 | 12/2011 | Thomas et al. |
| 8,092,064 B2 | 1/2012 | Erchak et al. |
| 8,125,579 B2 | 2/2012 | Khan et al. |
| 8,160,411 B2 | 4/2012 | Levola et al. |
| 8,195,220 B2 | 6/2012 | Kim et al. |
| 8,233,204 B1 | 7/2012 | Robbins et al. |
| 8,233,273 B2 | 7/2012 | Chen et al. |
| 8,246,170 B2 | 8/2012 | Yamamoto et al. |
| 8,274,614 B2 | 9/2012 | Yokote et al. |

(56) References Cited

U.S. PATENT DOCUMENTS

| | | |
|---|---|---|
| 8,384,999 B1 | 2/2013 | Crosby et al. |
| 8,392,035 B2 | 3/2013 | Patel et al. |
| 8,395,898 B1 | 3/2013 | Chamseddine et al. |
| 8,418,083 B1 | 4/2013 | Lundy et al. |
| 8,446,340 B2 | 5/2013 | Aharoni |
| 8,472,119 B1 | 6/2013 | Kelly |
| 8,482,920 B2 | 7/2013 | Tissot et al. |
| 8,576,143 B1 | 11/2013 | Kelly |
| 8,611,014 B2 | 12/2013 | Valera et al. |
| 8,629,815 B2 | 1/2014 | Brin et al. |
| 8,638,498 B2 | 1/2014 | Bohn et al. |
| 8,645,871 B2 | 2/2014 | Fong et al. |
| 8,666,212 B1 | 3/2014 | Amirparviz |
| 8,712,598 B2 | 4/2014 | Dighde et al. |
| 8,754,831 B2 | 6/2014 | Kollin et al. |
| 8,770,813 B2 | 7/2014 | Bohn et al. |
| 8,810,600 B2 | 8/2014 | Bohn et al. |
| 8,817,350 B1 | 8/2014 | Robbins et al. |
| 8,823,531 B1 | 9/2014 | McCleary et al. |
| 8,854,802 B2 | 10/2014 | Robinson et al. |
| 8,909,384 B1 | 12/2014 | Beitelmal et al. |
| 8,917,453 B2 | 12/2014 | Bohn |
| 8,934,235 B2 | 1/2015 | Rubenstein et al. |
| 8,941,683 B2 | 1/2015 | Son et al. |
| 8,989,535 B2 | 3/2015 | Robbins |
| 9,052,414 B2 | 6/2015 | Travis et al. |
| 9,151,984 B2 | 10/2015 | Fleck et al. |
| 9,223,138 B2 | 12/2015 | Bohn |
| 9,272,338 B2 | 3/2016 | Fujita et al. |
| 9,297,996 B2 | 3/2016 | Bohn et al. |
| 9,298,012 B2 | 3/2016 | Bohn et al. |
| 9,368,546 B2 | 6/2016 | Fleck et al. |
| 9,558,590 B2 | 1/2017 | Westerinen et al. |
| 9,578,318 B2 | 2/2017 | Fleck et al. |
| 9,581,820 B2 | 2/2017 | Robbins |
| 9,684,174 B2 | 6/2017 | Fleck et al. |
| 9,717,981 B2 | 8/2017 | Robbins et al. |
| 9,726,887 B2 | 8/2017 | Fleck et al. |
| 2001/0043208 A1 | 11/2001 | Furness, III et al. |
| 2002/0015110 A1 | 2/2002 | Brown Elliott |
| 2002/0041735 A1 | 4/2002 | Cai et al. |
| 2002/0044152 A1 | 4/2002 | Abbott et al. |
| 2002/0044162 A1 | 4/2002 | Sawatari |
| 2002/0063820 A1 | 5/2002 | Broer et al. |
| 2002/0097558 A1 | 7/2002 | Stone et al. |
| 2002/0171939 A1 | 11/2002 | Song |
| 2002/0180659 A1 | 12/2002 | Takahashi |
| 2003/0006364 A1 | 1/2003 | Katzir et al. |
| 2003/0023889 A1 | 1/2003 | Hofstee et al. |
| 2003/0137706 A1 | 7/2003 | Rmanujam et al. |
| 2003/0179453 A1 | 9/2003 | Mori et al. |
| 2004/0011503 A1 | 1/2004 | Kung et al. |
| 2004/0012341 A1 | 1/2004 | Hyuga |
| 2004/0085649 A1 | 5/2004 | Repetto et al. |
| 2004/0108971 A1 | 6/2004 | Waldern et al. |
| 2004/0109234 A1 | 6/2004 | Levola |
| 2004/0135209 A1 | 7/2004 | Hsieh et al. |
| 2004/0195963 A1 | 10/2004 | Choi et al. |
| 2004/0267990 A1 | 12/2004 | Lin |
| 2005/0174737 A1 | 8/2005 | Meir |
| 2005/0179372 A1 | 8/2005 | Kawakami et al. |
| 2005/0207120 A1 | 9/2005 | Tseng et al. |
| 2005/0225233 A1 | 10/2005 | Boroson et al. |
| 2005/0243107 A1 | 11/2005 | Haim et al. |
| 2005/0248705 A1 | 11/2005 | Smith et al. |
| 2005/0285878 A1 | 12/2005 | Singh et al. |
| 2005/0286125 A1 | 12/2005 | Sundstrom et al. |
| 2006/0018025 A1 | 1/2006 | Sharon et al. |
| 2006/0032616 A1 | 2/2006 | Yang |
| 2006/0038881 A1 | 2/2006 | Starkweather et al. |
| 2006/0044399 A1 | 3/2006 | Fredlund et al. |
| 2006/0054787 A1 | 3/2006 | Olsen et al. |
| 2006/0072206 A1 | 4/2006 | Tsuyuki et al. |
| 2006/0118280 A1 | 6/2006 | Liu |
| 2006/0129951 A1 | 6/2006 | Vaananen et al. |
| 2006/0132914 A1 | 6/2006 | Weiss et al. |
| 2006/0139447 A1 | 6/2006 | Unkrich |
| 2006/0152646 A1 | 7/2006 | Schrader |
| 2006/0164382 A1 | 7/2006 | Kulas et al. |
| 2006/0196643 A1 | 9/2006 | Hata et al. |
| 2006/0215244 A1 | 9/2006 | Yosha et al. |
| 2006/0221448 A1 | 10/2006 | Nivon et al. |
| 2006/0228073 A1 | 10/2006 | Mukawa et al. |
| 2006/0249765 A1 | 11/2006 | Hsieh |
| 2007/0002412 A1 | 1/2007 | Aihara |
| 2007/0008456 A1 | 1/2007 | Lesage et al. |
| 2007/0023703 A1 | 2/2007 | Sunaoshi et al. |
| 2007/0027591 A1 | 2/2007 | Goldenberg et al. |
| 2007/0041684 A1 | 2/2007 | Popovich et al. |
| 2007/0097019 A1 | 5/2007 | Wynne-Powell et al. |
| 2007/0147673 A1 | 6/2007 | Crandall |
| 2007/0153395 A1 | 7/2007 | Repetto et al. |
| 2007/0164988 A1 | 7/2007 | Ryu et al. |
| 2007/0177260 A1 | 8/2007 | Kuppenheimer et al. |
| 2007/0236959 A1 | 10/2007 | Tolbert |
| 2007/0284093 A1 | 12/2007 | Bhatti et al. |
| 2008/0007511 A1 | 1/2008 | Tsuboi et al. |
| 2008/0043100 A1 | 2/2008 | Sobel et al. |
| 2008/0043425 A1 | 2/2008 | Hebert et al. |
| 2008/0088603 A1 | 4/2008 | Eliasson et al. |
| 2008/0088624 A1 | 4/2008 | Long et al. |
| 2008/0106677 A1 | 5/2008 | Kuan et al. |
| 2008/0117341 A1 | 5/2008 | McGrew |
| 2008/0141681 A1 | 6/2008 | Arnold |
| 2008/0150913 A1 | 6/2008 | Bell et al. |
| 2008/0174735 A1 | 7/2008 | Quach et al. |
| 2008/0232680 A1 | 9/2008 | Berestov et al. |
| 2008/0248852 A1 | 10/2008 | Rasmussen |
| 2008/0280682 A1 | 11/2008 | Brunner et al. |
| 2008/0285140 A1 | 11/2008 | Amitai |
| 2008/0297535 A1 | 12/2008 | Reinig |
| 2008/0303918 A1 | 12/2008 | Keithley |
| 2008/0311386 A1 | 12/2008 | Wendt |
| 2009/0002939 A1 | 1/2009 | Baugh et al. |
| 2009/0015742 A1 | 1/2009 | Liao et al. |
| 2009/0021908 A1 | 1/2009 | Patel et al. |
| 2009/0051283 A1 | 2/2009 | Cok et al. |
| 2009/0084525 A1 | 4/2009 | Satou et al. |
| 2009/0084757 A1 | 4/2009 | Erokhin et al. |
| 2009/0092261 A1 | 4/2009 | Bard |
| 2009/0097127 A1 | 4/2009 | Amitai |
| 2009/0128449 A1 | 5/2009 | Brown et al. |
| 2009/0128901 A1 | 5/2009 | Tilleman et al. |
| 2009/0180250 A1 | 7/2009 | Holling et al. |
| 2009/0189974 A1 | 7/2009 | Deering |
| 2009/0190003 A1 | 7/2009 | Park et al. |
| 2009/0195756 A1 | 8/2009 | Li et al. |
| 2009/0222147 A1 | 9/2009 | Nakashima et al. |
| 2009/0244413 A1 | 10/2009 | Ishikawa et al. |
| 2009/0246707 A1 | 10/2009 | Li et al. |
| 2009/0256837 A1 | 10/2009 | Deb et al. |
| 2009/0262419 A1 | 10/2009 | Robinson et al. |
| 2010/0002989 A1 | 1/2010 | Tokushima |
| 2010/0018858 A1 | 1/2010 | Seki |
| 2010/0021108 A1 | 1/2010 | Kang et al. |
| 2010/0053151 A1 | 3/2010 | Marti et al. |
| 2010/0060551 A1 | 3/2010 | Sugiyama et al. |
| 2010/0061078 A1 | 3/2010 | Kim |
| 2010/0084674 A1 | 4/2010 | Paetzold et al. |
| 2010/0096617 A1 | 4/2010 | Shanks |
| 2010/0103078 A1 | 4/2010 | Mukawa et al. |
| 2010/0134534 A1 | 6/2010 | Sesselberg et al. |
| 2010/0141905 A1 | 6/2010 | Burke |
| 2010/0149073 A1 | 6/2010 | Chaum et al. |
| 2010/0188353 A1 | 7/2010 | Yoon et al. |
| 2010/0200736 A1 | 8/2010 | Laycock et al. |
| 2010/0201953 A1 | 8/2010 | Freeman et al. |
| 2010/0213467 A1 | 8/2010 | Lee et al. |
| 2010/0220439 A1 | 9/2010 | Qin |
| 2010/0229853 A1 | 9/2010 | Vandal et al. |
| 2010/0238270 A1 | 9/2010 | Bjelkhagen et al. |
| 2010/0238664 A1 | 9/2010 | Steenbergen |
| 2010/0245387 A1 | 9/2010 | Bachelder et al. |
| 2010/0259889 A1 | 10/2010 | Chen et al. |

(56) References Cited

U.S. PATENT DOCUMENTS

| | | |
|---|---|---|
| 2010/0271467 A1 | 10/2010 | Akeley |
| 2010/0277421 A1 | 11/2010 | Charlier et al. |
| 2010/0277439 A1 | 11/2010 | Charlier et al. |
| 2010/0277779 A1 | 11/2010 | Futterer et al. |
| 2010/0281439 A1 | 11/2010 | Markovic et al. |
| 2010/0287485 A1 | 11/2010 | Bertolami et al. |
| 2010/0300654 A1 | 12/2010 | Edwards |
| 2010/0309687 A1 | 12/2010 | Sampsell et al. |
| 2010/0315781 A1 | 12/2010 | Agostini |
| 2010/0317132 A1 | 12/2010 | Rogers et al. |
| 2010/0321609 A1 | 12/2010 | Qi et al. |
| 2010/0328351 A1 | 12/2010 | Tan |
| 2011/0012814 A1 | 1/2011 | Tanaka |
| 2011/0021251 A1 | 1/2011 | Lindén |
| 2011/0025605 A1 | 2/2011 | Kwitek |
| 2011/0032482 A1 | 2/2011 | Agurok |
| 2011/0050547 A1 | 3/2011 | Mukawa |
| 2011/0050655 A1 | 3/2011 | Mukawa |
| 2011/0063795 A1 | 3/2011 | Yeh et al. |
| 2011/0068699 A1 | 3/2011 | Knapp |
| 2011/0075442 A1 | 3/2011 | Chiang |
| 2011/0084893 A1 | 4/2011 | Lee et al. |
| 2011/0090343 A1 | 4/2011 | Alt et al. |
| 2011/0091156 A1 | 4/2011 | Laughlin |
| 2011/0114823 A1 | 5/2011 | Katzir et al. |
| 2011/0127024 A1 | 6/2011 | Patel et al. |
| 2011/0134017 A1 | 6/2011 | Burke |
| 2011/0134645 A1 | 6/2011 | Hitchcock et al. |
| 2011/0141388 A1 | 6/2011 | Park et al. |
| 2011/0148931 A1 | 6/2011 | Kim |
| 2011/0149201 A1 | 6/2011 | Powell et al. |
| 2011/0163986 A1 | 7/2011 | Lee et al. |
| 2011/0194029 A1 | 8/2011 | Herrmann et al. |
| 2011/0205251 A1 | 8/2011 | Auld |
| 2011/0210946 A1 | 9/2011 | Goertz et al. |
| 2011/0214082 A1 | 9/2011 | Osterhout et al. |
| 2011/0215349 A1 | 9/2011 | An et al. |
| 2011/0221658 A1 | 9/2011 | Haddick et al. |
| 2011/0221659 A1 | 9/2011 | King et al. |
| 2011/0222236 A1 | 9/2011 | Luo et al. |
| 2011/0227820 A1 | 9/2011 | Haddick et al. |
| 2011/0227913 A1 | 9/2011 | Hyndman |
| 2011/0242145 A1 | 10/2011 | Nishimura et al. |
| 2011/0242392 A1 | 10/2011 | Chiang |
| 2011/0242757 A1 | 10/2011 | Tracy et al. |
| 2011/0248904 A1 | 10/2011 | Miyawaki et al. |
| 2011/0248958 A1 | 10/2011 | Gruhlke et al. |
| 2011/0267799 A1 | 11/2011 | Epstein et al. |
| 2011/0283223 A1 | 11/2011 | Vaittinen et al. |
| 2011/0299044 A1 | 12/2011 | Yeh et al. |
| 2011/0304640 A1 | 12/2011 | Noge |
| 2011/0309378 A1 | 12/2011 | Lau et al. |
| 2011/0310232 A1 | 12/2011 | Wilson et al. |
| 2011/0310312 A1 | 12/2011 | Yokote et al. |
| 2012/0013651 A1 | 1/2012 | Trayner et al. |
| 2012/0019434 A1 | 1/2012 | Kuhlman et al. |
| 2012/0026161 A1 | 2/2012 | Chen et al. |
| 2012/0033306 A1 | 2/2012 | Valera et al. |
| 2012/0038629 A1 | 2/2012 | Brown et al. |
| 2012/0041721 A1 | 2/2012 | Chen |
| 2012/0050144 A1 | 3/2012 | Morlock |
| 2012/0052934 A1 | 3/2012 | Maharbiz et al. |
| 2012/0062998 A1 | 3/2012 | Schultz et al. |
| 2012/0069413 A1 | 3/2012 | Schultz |
| 2012/0083325 A1 | 4/2012 | Heatherly |
| 2012/0102438 A1 | 4/2012 | Robinson et al. |
| 2012/0105487 A1 | 5/2012 | Son et al. |
| 2012/0106170 A1 | 5/2012 | Matthews et al. |
| 2012/0111544 A1 | 5/2012 | Senatori |
| 2012/0113092 A1 | 5/2012 | Bar-Zeev et al. |
| 2012/0127577 A1 | 5/2012 | Desserouer |
| 2012/0157114 A1 | 6/2012 | Alameh et al. |
| 2012/0162764 A1 | 6/2012 | Shimizu |
| 2012/0176474 A1 | 7/2012 | Border |
| 2012/0182687 A1 | 7/2012 | Dighde et al. |
| 2012/0188205 A1 | 7/2012 | Jansson et al. |
| 2012/0200495 A1 | 8/2012 | Johansson |
| 2012/0206589 A1 | 8/2012 | Crandall |
| 2012/0206880 A1 | 8/2012 | Andres et al. |
| 2012/0218301 A1 | 8/2012 | Miller |
| 2012/0227006 A1 | 9/2012 | Amm |
| 2012/0235885 A1 | 9/2012 | Miller et al. |
| 2012/0242561 A1 | 9/2012 | Sugihara |
| 2012/0242798 A1 | 9/2012 | Mcardle et al. |
| 2012/0249797 A1 | 10/2012 | Haddick et al. |
| 2012/0256856 A1 | 10/2012 | Suzuki et al. |
| 2012/0256963 A1 | 10/2012 | Suzuki et al. |
| 2012/0287381 A1 | 11/2012 | Li et al. |
| 2012/0292535 A1 | 11/2012 | Choi et al. |
| 2013/0000871 A1 | 1/2013 | Olson et al. |
| 2013/0027772 A1 | 1/2013 | Large |
| 2013/0033485 A1 | 2/2013 | Kollin et al. |
| 2013/0081779 A1 | 4/2013 | Liao et al. |
| 2013/0093741 A1 | 4/2013 | Akimoto et al. |
| 2013/0106674 A1 | 5/2013 | Wheeler et al. |
| 2013/0162673 A1 | 6/2013 | Bohn |
| 2013/0163089 A1 | 6/2013 | Bohn |
| 2013/3155070 | 6/2013 | Luo |
| 2013/0170031 A1 | 7/2013 | Bohn |
| 2013/0186596 A1 | 7/2013 | Rubenstein et al. |
| 2013/0186598 A1 | 7/2013 | Rubenstein |
| 2013/0187943 A1 | 7/2013 | Bohn et al. |
| 2013/0201285 A1 | 8/2013 | Mao et al. |
| 2013/0207896 A1 | 8/2013 | Robinson et al. |
| 2013/0207964 A1 | 8/2013 | Fleck et al. |
| 2013/0208003 A1 | 8/2013 | Bohn |
| 2013/0208362 A1 | 8/2013 | Bohn |
| 2013/0208482 A1 | 8/2013 | Fleck et al. |
| 2013/0215081 A1 | 8/2013 | Levin et al. |
| 2013/0242056 A1 | 9/2013 | Fleck |
| 2013/0242555 A1 | 9/2013 | Mukawa |
| 2013/0250431 A1 | 9/2013 | Robbins et al. |
| 2013/0252628 A1 | 9/2013 | Kuehnel |
| 2013/0257848 A1 | 10/2013 | Westerinen et al. |
| 2013/0258701 A1 | 10/2013 | Westerinen et al. |
| 2013/0267309 A1 | 10/2013 | Robbins |
| 2013/0294030 A1 | 11/2013 | Wang et al. |
| 2013/0307875 A1 | 11/2013 | Anderson |
| 2013/0314793 A1 | 11/2013 | Robbins |
| 2013/0322810 A1 | 12/2013 | Robbins |
| 2013/0332159 A1 | 12/2013 | Federighi et al. |
| 2013/0335671 A1 | 12/2013 | Fleck |
| 2013/0342674 A1 | 12/2013 | Dixon |
| 2014/0010265 A1 | 1/2014 | Peng |
| 2014/0041827 A1 | 2/2014 | Giaimo et al. |
| 2014/0078130 A1 | 3/2014 | Uchino et al. |
| 2014/0094973 A1 | 4/2014 | Giaimo et al. |
| 2014/0104665 A1 | 4/2014 | Popovich et al. |
| 2014/0104685 A1 | 4/2014 | Bohn |
| 2014/0111865 A1 | 4/2014 | Kobayashi |
| 2014/0140653 A1 | 5/2014 | Brown et al. |
| 2014/0140654 A1 | 5/2014 | Brown et al. |
| 2014/0176528 A1 | 6/2014 | Robbins |
| 2014/0184699 A1 | 7/2014 | Ito et al. |
| 2014/0204455 A1 | 7/2014 | Popovich |
| 2014/0240842 A1 | 8/2014 | Nguyen et al. |
| 2014/0320399 A1 | 10/2014 | Kim et al. |
| 2015/0168731 A1 | 6/2015 | Robbins |
| 2015/0227231 A1 | 8/2015 | Chen |
| 2016/0033697 A1 | 2/2016 | Sainiemi et al. |
| 2016/0035539 A1 | 2/2016 | Sainiemi et al. |
| 2016/0231570 A1 | 8/2016 | Levola et al. |
| 2016/0234485 A1 | 8/2016 | Robbins et al. |
| 2016/0282625 A1 | 9/2016 | Fleck et al. |
| 2017/0140577 A1 | 5/2017 | Westerinen et al. |

FOREIGN PATENT DOCUMENTS

| | | |
|---|---|---|
| CN | 101029968 | 9/2007 |
| CN | 101589326 | 11/2009 |
| CN | 201491069 | 5/2010 |
| CN | 101881936 | 11/2010 |
| CN | 102004315 | 4/2011 |
| CN | 102096235 | 6/2011 |

(56) References Cited

FOREIGN PATENT DOCUMENTS

| | | |
|---|---|---|
| CN | 102156555 | 8/2011 |
| DE | 102007021036 | 11/2008 |
| EP | 0977022 | 2/2000 |
| EP | 1494109 | 1/2005 |
| EP | 1748370 | 1/2007 |
| EP | 2065750 | 6/2009 |
| EP | 2112547 | 10/2009 |
| EP | 2216678 | 1/2010 |
| EP | 2700987 | 2/2014 |
| EP | 3018524 | 5/2016 |
| JP | H02227340 | 9/1990 |
| JP | H0422358 | 1/1992 |
| JP | 7311303 | 11/1995 |
| JP | H08190640 | 7/1996 |
| JP | 2000276613 | 10/2000 |
| JP | 2001078234 | 3/2001 |
| JP | 2002358032 | 12/2002 |
| JP | 2005309638 | 11/2005 |
| JP | 2006349921 | 12/2006 |
| JP | 2008017135 | 1/2008 |
| JP | 2008097599 | 4/2008 |
| JP | 2008518368 | 5/2008 |
| JP | 2009187290 | 8/2009 |
| JP | 201061545 | 3/2010 |
| KR | 20090076539 | 7/2009 |
| KR | 20110070087 | 6/2011 |
| KR | 20120023458 | 3/2012 |
| TW | 200846700 | 12/2008 |
| WO | WO-9418595 | 8/1994 |
| WO | WO-0133282 | 5/2001 |
| WO | WO-0195027 | 12/2001 |
| WO | WO-03090611 | 11/2003 |
| WO | WO-2006054056 | 5/2006 |
| WO | WO-2008021504 | 2/2008 |
| WO | WO-2009077601 | 6/2009 |
| WO | WO-2010125337 | 11/2010 |
| WO | WO-2011003381 | 1/2011 |
| WO | WO-2011041466 | 4/2011 |
| WO | WO-2011051660 | 5/2011 |
| WO | WO-2011090455 | 7/2011 |
| WO | WO-2011106797 | 9/2011 |
| WO | WO-2011110728 | 9/2011 |
| WO | WO-2011131978 | 10/2011 |
| WO | WO-2012172295 | 12/2012 |
| WO | WO-2013164665 | 11/2013 |
| WO | WO-2014130383 | 8/2014 |

OTHER PUBLICATIONS

"Advisory Action", U.S. Appl. No. 13/432,311, dated Mar. 24, 2016, 3 pages.
"Augmented Reality and Physical Games", U.S. Appl. No. 13/440,165, filed Apr. 5, 2012, 49 pages.
"BragGrate Mirror", Retrieved from <http://web.archive.org/web/20090814104232/http://www.optigrate.com/BragGrate_Mirror.html> on Jul. 8, 2014, Aug. 14, 2009, 2 pages.
"Corrected Final Office Action", U.S. Appl. No. 13/432,311, dated Dec. 24, 2014, 25 pages.
"Corrected Notice of Allowance", U.S. Appl. No. 13/336,873, dated Sep. 11, 2015, 4 pages.
"Corrected Notice of Allowance", U.S. Appl. No. 13/336,873, dated Nov. 27, 2015, 4 pages.
"Corrected Notice of Allowance", U.S. Appl. No. 13/355,836, dated Sep. 11, 2014, 2 pages.
"Corrected Notice of Allowance", U.S. Appl. No. 13/355,836, dated Dec. 15, 2014, 2 pages.
"Corrected Notice of Allowance", U.S. Appl. No. 13/397,495, dated Mar. 3, 2016, 4 pages.
"Corrected Notice of Allowance", U.S. Appl. No. 13/397,516, dated Mar. 3, 2016, 2 pages.
"Corrected Notice of Allowance", U.S. Appl. No. 13/397,516, dated May 16, 2016, 2 pages.
"Corrected Notice of Allowance", U.S. Appl. No. 15/171,924, dated Nov. 30, 2016, 2 pages.
"DigiLens", SBG Labs—retrieved from <http://www.digilens.com/products.html> on Jun. 19, 2012, 1 page.
"Examiner's Answer to Appeal Brief", U.S. Appl. No. 13/428,879, dated Oct. 12, 2016, 18 pages.
"Examiner's Answer to Appeal Brief", U.S. Appl. No. 13/477,646, dated Oct. 26, 2016, 12 pages.
"Final Office Action", U.S. Appl. No. 13/336,873, dated Jan. 5, 2015, 21 pages.
"Final Office Action", U.S. Appl. No. 13/336,895, dated May 27, 2014, 11 pages.
"Final Office Action", U.S. Appl. No. 13/355,836, dated Mar. 10, 2014, 18 pages.
"Final Office Action", U.S. Appl. No. 13/355,914, dated Feb. 23, 2015, 21 pages.
"Final Office Action", U.S. Appl. No. 13/355,914, dated Jun. 19, 2014, 11 pages.
"Final Office Action", U.S. Appl. No. 13/397,495, dated May 29, 2014, 10 pages.
"Final Office Action", U.S. Appl. No. 13/397,516, dated Jan. 29, 2015, 13 pages.
"Final Office Action", U.S. Appl. No. 13/397,539, dated Apr. 21, 2016, 14 pages.
"Final Office Action", U.S. Appl. No. 13/397,539, dated Jun. 29, 2015, 11 pages.
"Final Office Action", U.S. Appl. No. 13/397,617, dated Sep. 21, 2016, 10 pages.
"Final Office Action", U.S. Appl. No. 13/397,617, dated Nov. 18, 2015, 11 pages.
"Final Office Action", U.S. Appl. No. 13/420,388, dated Apr. 21, 2016, 9 pages.
"Final Office Action", U.S. Appl. No. 13/428,879, dated Jul. 14, 2014, 12 pages.
"Final Office Action", U.S. Appl. No. 13/428,879, dated Dec. 10, 2015, 16 pages.
"Final Office Action", U.S. Appl. No. 13/432,311, dated Dec. 15, 2014, 24 pages.
"Final Office Action", U.S. Appl. No. 13/432,311, dated Dec. 18, 2015, 9 pages.
"Final Office Action", U.S. Appl. No. 13/432,372, dated Jan. 29, 2015, 33 pages.
"Final Office Action", U.S. Appl. No. 13/440,165, dated Jun. 6, 2014, 12 pages.
"Final Office Action", U.S. Appl. No. 13/440,165, dated Jul. 21, 2015, 11 pages.
"Final Office Action", U.S. Appl. No. 13/477,646, dated Feb. 23, 2015, 36 pages.
"Final Office Action", U.S. Appl. No. 13/477,646, dated Nov. 24, 2015, 39 pages.
"Final Office Action", U.S. Appl. No. 13/477,646, dated May 5, 2014, 26 pages.
"Final Office Action", U.S. Appl. No. 13/525,649, dated Oct. 9, 2014, 8 pages.
"Final Office Action", U.S. Appl. No. 13/722,917, dated Jun. 17, 2016, 19 pages.
"Final Office Action", U.S. Appl. No. 13/722,917, dated Sep. 23, 2015, 14 pages.
"Final Office Action", U.S. Appl. No. 13/774,875, dated Apr. 22, 2016, 10 pages.
"Final Office Action", U.S. Appl. No. 13/774,875, dated Jun. 4, 2015, 10 pages.
"Final Office Action", U.S. Appl. No. 14/134,993, dated Jul. 16, 2015, 19 pages.
"Final Office Action", U.S. Appl. No. 14/134,993, dated Aug. 20, 2014, 15 pages.
"Final Office Action", U.S. Appl. No. 14/617,606, dated Dec. 27, 2016, 13 pages.
"Foreign Notice of Allowance", CN Application No. 201320034345.X, dated Aug. 14, 2013, 2 Pages.
"Foreign Office Action", CN Application No. 201380015757.1, dated Jul. 11, 2016, 13 pages.

(56) References Cited

OTHER PUBLICATIONS

"Foreign Office Action", CN Application No. 201210563730.3, dated Jan. 7, 2015, 16 pages.
"Foreign Office Action", CN Application No. 201210567932.5, dated Aug. 14, 2014, 12 pages.
"Foreign Office Action", CN Application No. 201380017348.5, dated Jan. 14, 2016, 12 pages.
"Foreign Office Action", CN Application No. 201380017348.5, dated Jun. 17, 2016, 7 pages.
"Foreign Office Action", CN Application No. 201380017348.5, dated Oct. 18, 2016, 7 pages.
"Foreign Office Action", CN Application No. 201380067523.1, dated Aug. 22, 2016, 13 pages.
"Foreign Office Action", EP Application No. 13765041.2, dated Aug. 4, 2016, 5 pages.
"Foreign Office Action", EP Application No. 13765041.2, dated Aug. 5, 2015, 6 pages.
"Foreign Office Action", EP Application No. 13769961.7, dated Mar. 11, 2015, 8 pages.
"Foreign Office Action", EP Application No. 13769961.7, dated Jun. 30, 2015, 6 pages.
"Foreign Office Action", JP Application No. 2015-501688, dated Dec. 20, 2016, 8 pages.
"Foreign Office Action", TW Application No. 102101510, dated Dec. 6, 2016, 11 pages.
"HDTV Helmet Mounted Display", Available at <http://defense-update.com/products/h/HDTV-HMD.htm>, Jan. 26, 2005, 1 page.
"International Preliminary Report on Patentability", Application No. PCT/US2015/041900, dated Oct. 11, 2016, 6 pages.
"International Search Report and Written Opinion", Application No. PCT/US2012/069331, dated Mar. 29, 2013, 10 pages.
"International Search Report and Written Opinion", Application No. PCT/US2014/016658, dated Apr. 23, 2014, 10 pages.
"International Search Report and Written Opinion", Application No. PCT/US2013/053676, dated Oct. 16, 2013, 10 pages.
"International Search Report and Written Opinion", Application No. PCT/US2013/030632, dated Jun. 26, 2013, 10 pages.
"International Search Report and Written Opinion", Application No. PCT/US2016/015496, dated Apr. 11, 2016, 11 pages.
"International Search Report and Written Opinion", Application No. PCT/US2016/015873, dated May 23, 2016, 11 pages.
"International Search Report and Written Opinion", Application No. PCT/US2013/028477, dated Jun. 21, 2013, 11 pages.
"International Search Report and Written Opinion", Application No. PCT/US2013/031111, dated Jun. 26, 2013, 11 pages.
"International Search Report and Written Opinion", Application No. PCT/US2015/041900, dated Oct. 21, 2015, 12 pages.
"International Search Report and Written Opinion", Application No. PCT/US2013/076832, dated Mar. 17, 2014, 12 pages.
"International Search Report and Written Opinion", Application No. PCT/US2013/061225, dated Jun. 4, 2014, 12 pages.
"International Search Report and Written Opinion", Application No. PCT/US2015/041909, dated Oct. 20, 2015, 13 pages.
"International Search Report and Written Opinion", Application No. PCT/US2012/071563, dated Apr. 25, 2013, 13 pages.
"International Search Report and Written Opinion", Application No. PCT/US2013/021784, dated Apr. 30, 2013, 9 pages.
"International Search Report and Written Opinion", Application No. PCT/US2012/069330, dated Mar. 28, 2013, 9 pages.
"International Search Report and Written Opinion", Application No. PCT/US2013/021783, dated May 15, 2013, 9 pages.
"International Search Report and Written Opinion", Application No. PCT/US2013/026200, dated Jun. 3, 2013, 9 pages.
"Light Guide Techniques using LED Lamps", Application Brief I-003, retrieved from <http://www.ciri.org.nz/downloads/Lightpipe%20design.pdf> on Jan. 12, 2012, Oct. 14, 2008, 22 pages.
"Non-Final Office Action", U.S. Appl. No. 13/397,495, dated Nov. 13, 2013, 8 pages.
"Non-Final Office Action", U.S. Appl. No. 13/440,165, dated Feb. 6, 2014, 12 pages.
"Non-Final Office Action", U.S. Appl. No. 13/336,873, dated Apr. 9, 2015, 18 pages.
"Non-Final Office Action", U.S. Appl. No. 13/336,873, dated Jul. 25, 2014, 16 pages.
"Non-Final Office Action", U.S. Appl. No. 13/336,895, dated Oct. 24, 2013, 9 pages.
"Non-Final Office Action", U.S. Appl. No. 13/343,675, dated Jul. 16, 2013, 9 pages.
"Non-Final Office Action", U.S. Appl. No. 13/355,836, dated Nov. 4, 2013, 15 pages.
"Non-Final Office Action", U.S. Appl. No. 13/355,914, dated Feb. 14, 2014, 10 pages.
"Non-Final Office Action", U.S. Appl. No. 13/355,914, dated Oct. 28, 2014, 18 pages.
"Non-Final Office Action", U.S. Appl. No. 13/397,495, dated Apr. 3, 2015, 11 pages.
"Non-Final Office Action", U.S. Appl. No. 13/397,516, dated Jun. 12, 2014, 11 pages.
"Non-Final Office Action", U.S. Appl. No. 13/397,516, dated Sep. 24, 2015, 14 pages.
"Non-Final Office Action", U.S. Appl. No. 13/397,516, dated Nov. 25, 2013, 10 pages.
"Non-Final Office Action", U.S. Appl. No. 13/397,539, dated Mar. 16, 2015, 9 pages.
"Non-Final Office Action", U.S. Appl. No. 13/397,539, dated Sep. 9, 2016, 16 pages.
"Non-Final Office Action", U.S. Appl. No. 13/397,539, dated Oct. 1, 2015, 12 pages.
"Non-Final Office Action", U.S. Appl. No. 13/397,617, dated Jan. 12, 2017, 10 pages.
"Non-Final Office Action", U.S. Appl. No. 13/397,617, dated May 5, 2015, 6 pages.
"Non-Final Office Action", U.S. Appl. No. 13/397,617, dated May 18, 2016, 8 pages.
"Non-Final Office Action", U.S. Appl. No. 13/397,617, dated Oct. 9, 2014, 6 pages.
"Non-Final Office Action", U.S. Appl. No. 13/420,388, dated Dec. 4, 2015, 7 pages.
"Non-Final Office Action", U.S. Appl. No. 13/428,879, dated Feb. 24, 2015, 10 pages.
"Non-Final Office Action", U.S. Appl. No. 13/428,879, dated Mar. 17, 2014, 10 pages.
"Non-Final Office Action", U.S. Appl. No. 13/428,879, dated Jun. 26, 2015, 13 pages.
"Non-Final Office Action", U.S. Appl. No. 13/432,311, dated Jun. 2, 2015, 25 pages.
"Non-Final Office Action", U.S. Appl. No. 13/432,311, dated Jul. 8, 2014, 33 pages.
"Non-Final Office Action", U.S. Appl. No. 13/432,311, dated Aug. 17, 2016, 18 pages.
"Non-Final Office Action", U.S. Appl. No. 13/432,372, dated May 9, 2014, 26 pages.
"Non-Final Office Action", U.S. Appl. No. 13/432,372, dated Oct. 24, 2014, 27 pages.
"Non-Final Office Action", U.S. Appl. No. 13/440,165, dated Feb. 13, 2015, 10 pages.
"Non-Final Office Action", U.S. Appl. No. 13/440,165, dated Mar. 28, 2016, 13 pages.
"Non-Final Office Action", U.S. Appl. No. 13/440,165, dated Sep. 22, 2016, 13 pages.
"Non-Final Office Action", U.S. Appl. No. 13/440,165, dated Oct. 16, 2014, 11 pages.
"Non-Final Office Action", U.S. Appl. No. 13/477,646, dated Jun. 18, 2015, 43 pages.
"Non-Final Office Action", U.S. Appl. No. 13/477,646, dated Oct. 6, 2014, 34 pages.
"Non-Final Office Action", U.S. Appl. No. 13/477,646, dated Nov. 22, 2013, 20 pages.
"Non-Final Office Action", U.S. Appl. No. 13/525,649, dated Jan. 29, 2014, 7 pages.
"Non-Final Office Action", U.S. Appl. No. 13/525,649, dated Feb. 5, 2015, 7 pages.

(56) References Cited

OTHER PUBLICATIONS

"Non-Final Office Action", U.S. Appl. No. 13/525,649, dated Jun. 5, 2014, 7 pages.
"Non-Final Office Action", U.S. Appl. No. 13/570,073, dated Jan. 23, 2015, 7 pages.
"Non-Final Office Action", U.S. Appl. No. 13/631,308, dated Feb. 23, 2015, 9 pages.
"Non-Final Office Action", U.S. Appl. No. 13/722,917, dated Feb. 9, 2016, 17 pages.
"Non-Final Office Action", U.S. Appl. No. 13/722,917, dated May 21, 2015, 12 pages.
"Non-Final Office Action", U.S. Appl. No. 13/722,917, dated Dec. 6, 2016, 18 pages.
"Non-Final Office Action", U.S. Appl. No. 13/774,875, dated Sep. 16, 2015, 8 pages.
"Non-Final Office Action", U.S. Appl. No. 13/774,875, dated Nov. 24, 2014, 8 pages.
"Non-Final Office Action", U.S. Appl. No. 14/134,993, dated Jan. 22, 2015, 17 pages.
"Non-Final Office Action", U.S. Appl. No. 14/134,993, dated Apr. 17, 2014, 34 pages.
"Non-Final Office Action", U.S. Appl. No. 14/617,606, dated May 23, 2016, 12 pages.
"Non-Final Office Action", U.S. Appl. No. 14/617,606, dated Sep. 9, 2016, 12 pages.
"Non-Final Office Action", U.S. Appl. No. 14/617,769, dated Jan. 12, 2017, 10 pages.
"Non-Final Office Action", U.S. Appl. No. 15/171,924, dated Jul. 13, 2016, 8 pages.
"Notice of Allowance", U.S. Appl. No. 13/336,873, dated Jul. 31, 2015, 6 pages.
"Notice of Allowance", U.S. Appl. No. 13/336,895, dated Aug. 11, 2014, 6 pages.
"Notice of Allowance", U.S. Appl. No. 13/343,675, dated Sep. 16, 2013, 8 pages.
"Notice of Allowance", U.S. Appl. No. 13/355,836, dated Jun. 13, 2014, 11 pages.
"Notice of Allowance", U.S. Appl. No. 13/355,836, dated Oct. 8, 2014, 11 pages.
"Notice of Allowance", U.S. Appl. No. 13/356,545, dated Mar. 28, 2014, 6 pages.
"Notice of Allowance", U.S. Appl. No. 13/397,495, dated Oct. 20, 2015, 6 pages.
"Notice of Allowance", U.S. Appl. No. 13/397,516, dated Feb. 1, 2016, 7 pages.
"Notice of Allowance", U.S. Appl. No. 13/420,388, dated Oct. 6, 2016, 5 pages.
"Notice of Allowance", U.S. Appl. No. 13/488,145, dated Nov. 19, 2014, 8 pages.
"Notice of Allowance", U.S. Appl. No. 13/525,649, dated Jun. 15, 2015, 4 pages.
"Notice of Allowance", U.S. Appl. No. 14/134,993, dated Nov. 17, 2015, 9 pages.
"Notice of Allowance", U.S. Appl. No. 14/635,474, dated Oct. 17, 2016, 10 pages.
"Notice of Allowance", U.S. Appl. No. 15/171,924, dated Feb. 1, 2017, 8 pages.
"Notice of Allowance", U.S. Appl. No. 15/171,924, dated Oct. 21, 2016, 8 pages.
"Restriction Requirement", U.S. Appl. No. 13/355,836, dated Sep. 27, 2013, 6 pages.
"Restriction Requirement", U.S. Appl. No. 13/397,539, dated Dec. 1, 2014, 6 pages.
"Restriction Requirement", U.S. Appl. No. 13/420,388, dated Aug. 13, 2015, 6 pages.
"Restriction Requirement", U.S. Appl. No. 13/488,145, dated Sep. 8, 2014, 14 pages.
"Restriction Requirement", U.S. Appl. No. 13/570,073, dated Nov. 18, 2014, 7 pages.
"Restriction Requirement", U.S. Appl. No. 14/635,474, dated Jul. 12, 2016, 5 pages.
"Supplemental Notice of Allowance", U.S. Appl. No. 13/356,545, dated Jul. 22, 2014, 2 pages.
"Supplemental Notice of Allowance", U.S. Appl. No. 13/397,495, dated Jan. 26, 2016, 4 pages.
"Supplemental Notice of Allowance", U.S. Appl. No. 14/134,993, dated Mar. 2, 2016, 6 pages.
"Supplemental Notice of Allowance", U.S. Appl. No. 14/447,464, dated Jan. 12, 2016, 2 pages.
"Supplementary European Search Report", EP Application No. 13765041.2, dated Jul. 21, 2015, 3 pages.
"Supplementary European Search Report", EP Application No. 13769961.7, dated Mar. 3, 2015, 3 pages.
"Two-Faced: Transparent Phone with Dual Touch Screens", Retrieved from <http://gajitz.com/two-faced-transparent-phone-with-dual-touch-screens/>, Jun. 7, 2012, 3 pages.
"Written Opinion", Application No. PCT/US2013/061225, dated Oct. 10, 2014, 6 Pages.
Allen,"ELiXIR—Solid-State Luminaire with Enhanced Light Extraction by Internal Reflection", Journal of Display Technology, vol. 3, No. 2, Available at <http://www.nanolab.uc.edu/Publications/PDFfiles/355.pdf>, Jun. 2007, pp. 155-159.
Ando,"Development of Three-Dimensional Microstages Using Inclined Deep-Reactive Ion Etching", Journal of Microelectromechanical Systems, Jun. 1, 2007, 10 pages.
Aron,"'Sprinting' chips could push phones to the speed limit", New Scientist, Feb. 20, 2012, Issue #2852, Feb. 20, 2012, 2 pages.
Baluja,"Non-Intrusive Gaze Tracking Using Artificial Neural Networks", Technical Report CMU-CS-94-102, Available at <http://citeseerx.ist.psu.edu/viewdoc/download?doi=10. 1. 1.33.4027&rep=rep1&type=pdf> , Jan. 5, 1994, 14 pages.
Barger,"COTS Cooling", Publication of the National Electronics Manufacturing Center of Excellence, Retrieved from: <http://www.empf.org/empfasis/2009/Oct09/cots.html > on Jul. 9, 2012, Oct. 2009, 4 pages.
Baudisch,"Back-of-Device Interaction Allows Creating Very Small Touch Devices", In Proceedings of 27th International Conference on Human Factors in Computing Systems, Retrieved from <http://citeseerx.ist.psu.edu/viewdoc/download?doi=10. 1. 1. 160.3337&rep=rep1&type=pdf >, Apr. 2005, 10 pages.
Baxtor,"TwinTech GeForce GTS 250 XT OC 1GB Graphics Card", retrieved from <http://www.tweaktown.com/reviews/2733/twintech_geforce_gts_250_xt_oc_1gb_graphics_card/index3.html> on Dec. 30, 2011, Apr. 24, 2009, 4 pages.
Chen,"Strategies for 3D Video with Wide Fields-of-View", IEEE Proceeding Optoelectronics, vol. 148, Issue 2, Available at <http://ieeexplore.ieee.org/stamp/stamp.jsp?tp=&arnumber=926823>, Apr. 2001, pp. 85-90.
Cheng,"Waveguide Displays Based on Polymer-dispersed Liquid Crystals", SPIE Newsroom, Available at <http://spie.org/documents/Newsroom/Imported/003805/003805_10.pdf>, Aug. 12, 2011, 2 pages.
Chirgwin,"Researchers propose 'overclock' scheme for mobiles—Processing at a sprint to overcome tech limitations", The Register, Feb. 21, 2012, Feb. 21, 2012, 2 pages.
Coldewey,"Researchers Propose "Computational Sprinting" to Speed Up Chips by 1000%—But Only for a Second", TechCrunch, Feb. 28, 2012, Feb. 29, 2012, 2 pages.
DeAgazio,"Selecting Display Backlighting for Portable, Handheld Devices", Hearst Electronics Products, retrieved from <http://www2.electronicproducts.com/Selecting_display_backlighting_for_portable_handheld_devices-article-farcglobal-feb2008-html.aspx> on Jan. 12, 2012, Jan. 2, 2008, 4 pages.
Eadicicco,"First Transparent Tablet Lets You Touch From Both Sides", Retrieved from <http://blog.laptopmag.com/first-transparent-tablet>, Dec. 26, 2013, 4 pages.
Gila,"First Results From a Multi-Ion Beam Lithography and Processing System At the University of Florida", AIP Conference Proceedings, Jun. 1, 2011, 6 pages.
Greenemeier,"Could "Computational Sprinting" Speed Up Smart Phones without Burning Them Out?", Scientific American, Feb. 29, 2012, Feb. 29, 2012, 2 pages.

(56) References Cited

OTHER PUBLICATIONS

Han,"Accurate diffraction efficiency control for multiplexed volume holographic gratings", Retrieved at: opticalengineering.spiedigitallibrary.org/data/Journals/ . . . /2799_1, 2002, 4 pages.
Hua,"Engineering of Head-mounted Projective Displays", In Proceedings of Applied Optics, vol. 39, No. 22, Aug. 1, 2000, 11 pages.
Jacques,"Polarized Light Imaging of Tissue", Available at <http://www.lumamed.com/documents/5_polarized%20light%20imaging.pdf>, 2004, 17 pages.
Jarvenpaa,"Compact near-to-eye display with integrated gaze tracker", Second International Conference on Computer Engineering and Applications, Mar. 19, 2010, 9 pages.
Jaworski,"A Novel Design of Heat Sink with PCM for Electronics Cooling", 10th International Conference on Thermal Energy Storage, Stockton, May 31-Jun. 2, 2006, retrieved from <https://intraweb.stockton.edu/eyos/energy_studies/content/docs/FINAL_PRESENTATIONS/4b-6%20.pdf> on Jan. 5, 2012, May 31, 2006, 8 pages.
Karp,"Planar Micro-optic Solar Concentration using Multiple Imaging Lenses into a Common Slab Waveguide", In Proceedings of SPIE vol. 7407, Available at <http://psilab.ucsd.edu/research/slab_concentration/files/SPIE_Slab_Published.pdf>, Jan. 2009, 11 pages.
Kress,"Exit Pupil for Wearable See-through displays", Downloaded From: http://proceedings.spiedigitallibrary.org/ on Jan. 31, 2015 Terms of Use: http://spiedl.org/terms, 2012, 8 pages.
Krishnan,"A Novel Hybrid Heat Sink Using Phase Change Materials for Transient Thermal Management of Electronics", IEEE transactions on components and packaging technologies, vol. 28, No. 2, retrieved from <http://ieeexplore.ieee.org/stamp/stamp.jsp?tp=&arnumber=1432936> on Jan. 5, 2012, Jun. 2005, pp. 281-289.
Lanman,"Near-eye Light Field Displays", In Journal of ACM Transactions on Graphics, vol. 32, No. 6, Nov. 2013, 10 pages.
Large,"Parallel Optics in Waveguide Displays: a Flat Panel Autostereoscopic", Display Technology, Journal of, Retrieved from <http://download.microsoft.com/download/D/2/E/D2E425F8-CF3C-4C71-A4A2-70F9D4081007/ParallelOpticsinWaveguideDisplaysMS090925.Final.pdf>, Jun. 21, 2010, pp. 1-7.
Lerner,"Penn Helps Rethink Smartphone Design With 'Computational Sprinting'", Penn News Release, Feb. 28, 2012, 2 pages.
Li,"Design Optimization of Reflective Polarizers for LCD Backlight Recycling", Journal of Display Technology, vol. 5, No. 8, Available at <http://ieeexplore.ieee.org/stamp/stamp.jsp?tp=&arnumber=5196840 >, Aug. 2009, pp. 335-340.
Li,"Switchable Electro-optic Diffractive Lens with High Efficiency for Ophthalmic Applications", PNAS Apr. 18, 2006 vol. 103 No. 16 6100-6104, Retrieved from: <http://www.pnas.org/content/103/16/6100.1ong> Feb. 22, 2012, Feb. 2, 2006, 4 pages.
Man,"IT Equipment Noise Emission Standards: Overview of New Development in the Next Edition of ISO/ECMA Standards", In Proceedings of 37th International Congress and Exposition on Noise Control Engineering, Available at <http://www.ecma-international.org/activities/Acoustics/Inter-noise%202008%20paper%20on%20ECMA-74%20updates.pdf >, Oct. 26, 2008, 8 pages.
Massenot,"Multiplexed holographic transmission gratings recorded in holographic polymer-dispersed liquid crystals: static and dynamic studies", Retrieved at: http://oatao.univ-toulouse.fr/2874/, 2005, 8 pages.
McMillan,"Your Future iPhone May Be Stuffed With Wax", Aug. 23, 2013, 3 pages.
Melcher,"LCoS for High Performance Displays", In Proceedings of LEOS 2003, Available at <http://ieeexplore.ieee.org/stamp/stamp.jsp?tp=&arnumber=1253048>, Oct. 27, 2003, pp. 812-813.
Minier,"Diffraction Characteristics of Superimposed Holographic gratings in Planar Optical waveguides", IEEE Photonics Technology Letters, vol. 4, No. 10, Oct. 1992, 4 pages.
Moore,"Computational sprinting pushes smartphones till they're tired", Michigan News Release, Feb. 28, 2012, 2 pages.
Nguyen,"Advanced Cooling System Using Miniature Heat Pipes in Mobile PC", IEEE Transactions on Components and Packaging Technology, vol. 23, No. 1, Available at <http://ieeexplore.ieee.org/stamp/stamp.jsp?tp=&arnumber=833046&userType=inst>, Mar. 2000, pp. 86-90.
Owano,"Study explores computing bursts for smartphones", PhysOrg.com, Feb. 21, 2012, Feb. 21, 2012, 2 pages.
Papaefthymiou,"Computational Sprinting on a Hardware/Software Testbed", In the Proceedings of the 18th Eighteenth International Conference on Architectural Support for Programming Languages and Operating Systems (ASPLOS), Mar. 2013., Mar. 2013, 12 pages.
Patrizio,"Researchers Working on Ways to Put 16-Core Processors in Smartphones", Brighthand, Mar. 18, 2012, Mar. 18, 2012, 2 pages.
Pu,"Exposure schedule for multiplexing holograms in photopolymer films", Retrieved at: lo.epfl.ch/webdav/site/lo/shared/1996/OE_35_2824_Oct1996.pdf, Oct. 1996, 6 pages.
Raghavan,"Computational Sprinting", In the Proceedings of the 18th Symposium on High Performance Computer Architecture (HPCA), Feb. 2012, Feb. 2012, 12 pages.
Raghavan,"Designing for Responsiveness With Computational Sprinting", IEEE Micro's "Top Picks of 2012" Issue, May 2013, 8 pages.
Schrauwen,"Focused-Ion-Beam Fabrication of Slanted Grating Couplers in Silicon-on-Insulator Waveguides", IEEE Photonics Technology Letters, vol. 19, Issue 11, Jun. 1, 2007, 3 pages.
Scott,"RearType: Text Entry Using Keys on the Back of a Device", In Proceedings of 12th Conference on Human-Computer Interaction with Mobile Devices and Services, Retrieved from <https://research.microsoft.com/pubs/135609/reartype%20mobilehci.pdf>, Sep. 7, 2010, 9 pages.
Singh"Laser-Based Head-Tracked 3D Display Research", Journal of Display Technology, vol. 6, No. 10, Available at <http://ieeexplore.ieee.org/stamp/stamp.jsp?tp=&arnumber=5462999>, Oct. 2010, pp. 531-543.
Stupar,"Optimization of Phase Change Material Heat Sinks for Low Duty Cycle High Peak Load Power Supplies", IEEE transactions on components, packaging and manufacturing technology, retrieved from <http://ieeexplore.ieee.org/stamp/stamp.jsp?tp=&arnumber=6081913> on Jan. 5, 2012, Nov. 15, 2011, 14 pages.
Tari,"CFD Analyses of a Notebook Computer Thermal Management System and a Proposed Passive Cooling Alternative", IEEE Transactions on Components and Packaging Technologies, vol. 33, No. 2, retrieved from <http://ieeexplore.ieee.org/stamp/stamp.jsp?tp=&arnumber=5466211> on Dec. 30, 2011, Jun. 2010, pp. 443-452.
Travis,"Collimated Light from a Waveguide for a Display Backlight", Optics Express Retrieved from <http://download.microsoft.com/download/D/2/E/D2E425F8-CF3C-4C71-A4A2-70F9D4081007/OpticsExpressbacklightpaper.pdf>, Oct. 15, 2009, pp. 19714-19719.
Travis,"The Design of Backlights for View-Sequential 3D", Microsoft Corporation, Available at <http://download.microsoft.com/download/D/2/E/D2E425F8-CF3C-4C71-A4A2-70F9D4081007/Backlightforviewsequentialautostereo.docx>, Jul. 3, 2010, 4 pages.
van"A Survey of Augmented Reality Technologies, Applications and Limitations", The International Journal of Virtual Reality, 2010, 9(2), Available at <http://www.ijvr.org/issues/issue2-2010/paper1%20.pdf>, Jun. 2010, pp. 1-19.
Walker,"Thermalright Ultra-120 Extreme CPU Cooler", retrieved from <http://www.pro-clockers.com/cooling/66-thermalright-ultra-120-extreme-cpu-cooler.html> on Dec. 30, 2011, Jul. 2, 2009, 7 pages.
Westerinen,"Light Guide Display and Field of View", U.S. Appl. No. 13/428,879, filed Mar. 23, 2012, 46 pages.
Wigdor,"LucidTouch: A See-Through Mobile Device", In Proceedings of 20th Annual ACM symposium on User Interface Software and Technology, Retrieved from <http://dl.acm.org/citation.cfm?id=1294259>, Oct. 7, 2007, 10 pages.
Yan,"Multiplexing holograms in the photopolymer with equal diffraction efficiency", 2005, 9 pages.

(56) References Cited

OTHER PUBLICATIONS

Zharkova,"Study of the Dynamics of Transmission Gratings Growth on Holographic Polymer-Dispersed Liquid Crystals", International Conference on Methods of Aerophysical Research, ICMAR 2008, 2008, 4 pages.
"Corrected Notice of Allowance", U.S. Appl. No. 15/171,924, dated May 17, 2017, 2 pages.
"Ex Parte Quayle Action", U.S. Appl. No. 14/617,769, dated Jun. 2, 2017, 7 pages.
"Final Office Action", U.S. Appl. No. 13/432,311, dated May 15, 2017, 22 pages.
"Final Office Action", U.S. Appl. No. 13/432,372, dated Mar. 18, 2016, 36 pages.
"Final Office Action", U.S. Appl. No. 14/178,731, dated Aug. 12, 2015, 13 pages.
"Foreign Notice of Allowance", CN Application No. 201380067523.1, dated Jun. 2, 2017, 4 pages.
"Foreign Office Action", Application No. 13770174.4, dated Dec. 21, 2015, 6 pages.
"Foreign Office Action", AU Application No. 2013361148, dated Apr. 11, 2017, 3 pages.
"Foreign Office Action", CN Application No. 201380017346.6, dated Jan. 25, 2017, 7 pages.
"Foreign Office Action", CN Application No. 201380017346.6, dated Jan. 28, 2016, 12 pages.
"Foreign Office Action", CN Application No. 201380017346.6, dated Oct. 9, 2016, 7 pages.
"Foreign Office Action", CN Application No. 201380067523.1, dated Apr. 17, 2017, 6 pages.
"Foreign Office Action", EP Application No. 13770174.4, dated Mar. 11, 2015, 8 pages.
"Foreign Office Action", EP Application No. 13770174.4, dated Jul. 1, 2015, 6 pages.
"Foreign Office Action", JP Application No. 2015-503284, dated Dec. 22, 2016, 12 pages.
"International Preliminary Report on Patentability", Application No. PCT/US2016/015871, dated May 15, 2017, 10 pages.
"International Preliminary Report on Patentability", Application No. PCT/US2016/015873, dated May 15, 2017, 8 pages.
"International Preliminary Report on Patentability", Application No. PCT/US2016/015496, dated May 4, 2017, 9 pages.
"International Search Report and Written Opinion", Application No. PCT/US2015/014699, dated May 4, 2015, 16 Pages.
"Non-Final Office Action", U.S. Appl. No. 13/432,372, dated Jul. 1, 2016, 11 pages.
"Non-Final Office Action", U.S. Appl. No. 13/432,372, dated Aug. 27, 2015, 35 pages.
"Non-Final Office Action", U.S. Appl. No. 14/178,731, dated Apr. 17, 2015, 10 pages.
"Notice of Allowance", U.S. Appl. No. 13/432,372, dated Sep. 14, 2016, 10 pages.
"Second Written Opinion", Application No. PCT/US2016/015869, dated Jan. 20, 2017, 5 pages.
"Supplemental Notice of Allowance", U.S. Appl. No. 13/432,372, dated Oct. 6, 2016, 4 pages.
"Supplemental Notice of Allowance", U.S. Appl. No. 13/432,372, dated Dec. 30, 2016, 4 pages.
"Supplemental Notice of Allowance", U.S. Appl. No. 14/635,474, dated Feb. 2, 2017, 4 pages.
"Supplementary European Search Report", EP Application No. 13770174.4, dated Mar. 3, 2015, 3 pages.
Travis,"Wedge Optics in Flat Panel Displays", Retrieved from: http://download.microsoft.com/download/4/B/4/4B49C102-407A-4CEA-ADB5-EF4E4E7F5F63/Wedge%20optics%20in%20flat%20panel%20displays.pdf, Jul. 14, 2011, 15 Pages.
"Corrected Notice of Allowance", U.S. Appl. No. 13/397,539, dated Apr. 12, 2017, 2 pages.
"Corrected Notice of Allowance", U.S. Appl. No. 13/397,539, dated Apr. 24, 2017, 2 pages.
"Corrected Notice of Allowance", U.S. Appl. No. 15/171,924, dated Mar. 31, 2017, 2 pages.
"Foreign Notice of Allowance", TW Application No. 102101510, dated Mar. 23, 2017, 4 pages.
"Foreign Office Action", AU Application No. 2013361148, dated Feb. 15, 2017, 3 pages.
"Foreign Office Action", CN Application No. 201380015757.1, dated Mar. 27, 2017, 12 pages.
"Non-Final Office Action", U.S. Appl. No. 14/617,606, dated Mar. 27, 2017, 14 pages.
"Notice of Allowance", U.S. Appl. No. 13/397,539, dated Mar. 22, 2017, 7 pages.
"Notice of Allowance", U.S. Appl. No. 13/397,617, dated Apr. 25, 2017, 5 pages.
"Notice of Allowance", U.S. Appl. No. 13/440,165, dated Mar. 23, 2017, 5 pages.
"Second Written Opinion", Application No. PCT/US2016/015496, dated Feb. 9, 2017, 7 pages.
"Second Written Opinion", Application No. PCT/US2016/015873, dated Feb. 6, 2017, 6 pages.
"Advisory Action", U.S. Appl. No. 13/432,311, dated Jul. 14, 2017, 3 pages.
"Corrected Notice of Allowance", U.S. Appl. No. 13/397,539, dated Jun. 29, 2017, 2 pages.
"Corrected Notice of Allowance", U.S. Appl. No. 13/397,617, dated Aug. 15, 2017, 2 pages.
"Corrected Notice of Allowance", U.S. Appl. No. 13/397,617, dated Jul. 26, 2017, 3 pages.
"Final Office Action", U.S. Appl. No. 13/722,917, dated Jul. 12, 2017, 19 pages.
"Final Office Action", U.S. Appl. No. 14/617,606, dated Sep. 5, 2017, 15 pages.
"Foreign Notice of Allowance", AU Application No. 2013361148, dated Jul. 17, 2017, 3 pages.
"Foreign Office Action", JP Application No. 2015-501688, dated Jul. 4, 2017, 6 pages.
"Non-Final Office Action", U.S. Appl. No. 14/447,446, dated Jun. 9, 2017, 15 pages.
"Non-Final Office Action", U.S. Appl. No. 13/432,311, dated Sep. 20, 2017, 27 pages.

IMAGING STRUCTURE EMITTER CALIBRATION

RELATED APPLICATION

This application is a continuation of and claims priority to U.S. patent application Ser. No. 13/420,388 filed Mar. 14, 2012 entitled "Imaging Structure Emitter Calibration", the disclosure of which is incorporated by reference herein in its entirety.

BACKGROUND

Virtual reality can be viewed as a computer-generated simulated environment in which a user has an apparent physical presence. A virtual reality experience can be generated in 3D and viewed with a head-mounted display (HMD), such as glasses or other wearable display device that has near-eye display panels as lenses to display a virtual reality environment, which replaces the actual environment. Augmented reality, however, provides that a user can still see through the display lenses of the glasses or other wearable display device to view the surrounding environment, yet also see images of virtual objects that are generated for display and appear as a part of the environment. Augmented reality can include any type of input such as audio and haptic inputs, as well as virtual images, graphics, and video that enhances or augments the environment that a user experiences. As an emerging technology, there are many challenges and design constraints with augmented reality, from generation of the virtual objects and images so that they appear realistic in a real environment, to developing the optics small and precise enough for implementation with a wearable display device. There are also challenges to developing illumination sources for implementation as micro projectors and/or imaging units for wearable display devices.

Conventional LCOS (liquid crystal on silicon) projection technologies use an LED (light emitting diode) or laser source to generate light that is reflected off of a silicon transistor array covered by an LCD (liquid crystal display) material to either reflect and/or change the polarization of the light. The LCOS reflective technology uses liquid crystals instead of individual micro-minor array MEMS (micro-electro-mechanical systems) mirrors. The liquid crystals are applied to a reflective mirror substrate and, as the liquid crystals open and close, the light is either reflected from the mirror below or blocked to modulate the emitted light. LCOS-based projectors typically use three LCOS chips, one each to modulate the red, green, and blue (RGB) components of the light. Similar to an LCD projector which uses three LCD panels, both LCOS and LCD projectors simultaneously project the red, green, and blue components of the light, such as for display on a display screen. A conventional display technology utilizes OLEDs (organic light emitting diodes) that generate light when current is applied through layers of the organic material. Although OLED cells can be individually controlled for illumination, unlike the LCOS material, the OLEDs are not viable for projection illumination because they do not emit enough light.

Some conventional LED array scanning systems for display technologies that have large optical systems are typically too large and complex to be implemented in imaging units for wearable display devices. Limitations of the current technology include the ability to modulate the emitters in sequence in a scanning system, which can result in a slow refresh rate, a blurred image quality, and/or limited color depth. Another limitation of conventional LED array scanning systems is the relatively larger pitch between the LED emitters, which results in a larger optical system with size and weight barriers to implementation in a consumer HMD product. The light that is emitted for LED array scanning is moved across a surface, such as via a MEMS mirror, LC scanner, or by moving optics. However, the light efficiency of each emitter can vary based on production and material variances, bonding issues, connectivity issues, driver variance, micro-optics, color conversion variance, temperature, and/or optic differences across the surface.

A number of correction techniques can be applied to drive each emitter with a correction curve to adjust for light efficiency variances. However, many of the correction curves are determined during manufacture and cannot be adjusted during use. Testing during production and manufacture can also be difficult and expensive because each emitter is tested at various emission points. Unlike conventional display devices, line and/or block scanning displays can exhibit display anomalies due to emitter light efficiency variances because any errors are also scanned over the display surface. For example, a single pixel failure in a conventional display may not be noticeable in a production device, whereas an error in a scanning device may result in an entire row of pixels being lost or displaying the incorrect light intensity level.

SUMMARY

This Summary introduces simplified concepts of imaging structure emitter calibration, and the concepts are further described below in the Detailed Description and/or shown in the Figures. This Summary should not be considered to describe essential features of the claimed subject matter, nor used to determine or limit the scope of the claimed subject matter.

Imaging structure emitter calibration is described. In embodiments, an imaging unit includes an emitter structure that direct emits light, and optics direct the light along a light path in the imaging unit to illuminate a projection surface. A reflective panel reflects a portion of the light to illuminate a light sensor. An imaging application receives the sensor data from the light sensor, where the sensor data corresponds to emitted light output from the emitter structure. The imaging application can then initiate a calibration input to the emitter structure to adjust the emitted light output from the emitter structure.

In other embodiments, the emitter structure is implemented as individual embedded light sources that direct emit the light, and the individual embedded light sources cycle to emit the light one at a time. The light sensor can be implemented as a linear array of light detectors, and the imaging application receives the sensor data from the linear array of light detectors. The imaging application can then compute a correction value for each of the individual embedded light sources of the emitter structure over a time duration, and initiate the calibration input for each individual embedded light source. The calibration input adjusts the emitted light output from the individual embedded light sources, and also corrects for operational conditions that affect the emitted light output from the emitter structure.

BRIEF DESCRIPTION OF THE DRAWINGS

Embodiments of imaging structure emitter calibration are described with reference to the following Figures. The same numbers may be used throughout to reference like features and components that are shown in the Figures.

DETAILED DESCRIPTION

Embodiments of imaging structure emitter calibration are described. An imaging structure can be formed in inorganic material and implemented for individual cell control (e.g., individual pixel control), where each cell is a direct emitter designed to emit a bright output of light that can be used for a number of optical solutions, such as with light guides, waveguides, projection, and/or free form optics solutions. For example, light that is emitted from the embedded light sources (e.g., RGB iLEDs or lasers) can be reflected through a micro lens optic and then directed in an imaging system of a wearable display device (e.g., glasses or a head-mounted display), such as reflected off of a MEMS mirror and then directed into a waveguide or otherwise projected.

In embodiments, imaging structure emitter calibration provides a technique to continuously monitor and correct emitted light levels from the embedded light sources in an imaging structure for one-dimensional and two-dimensional scan display solutions. An imaging structure can be implemented with red, green, and/or blue (RGB) embedded light sources, such as lasers, iLEDs, or OLEDs in various one-dimensional (1D), two-dimensional (2D), or n-dimensional arrays, structures, and configurations. A one-dimensional or two-dimensional array of the embedded light sources in an imaging structure can each be independently driven for a specific value at a particular time, which allows calibration over time of the entire array of emitters.

Sensor results can be used to compute future correction values for each individual embedded light source in the emitter structure. Additionally, operational variances for temperature, ambient light, and other environmental and operational conditions can be applied for all of the pixels, as well as monitored and adjusted over time. Embodiments of imaging structure emitter calibration provides for initial testing of the emitters in the emitter structure followed with any sequence of specific testing to generate a more accurate correction to adjust the light output from the individual emitters.

While features and concepts of imaging structure emitter calibration can be implemented in any number of different devices, systems, environments, and/or configurations, embodiments of imaging structure emitter calibration are described in the context of the following example devices, systems, and methods.

Figure 1:
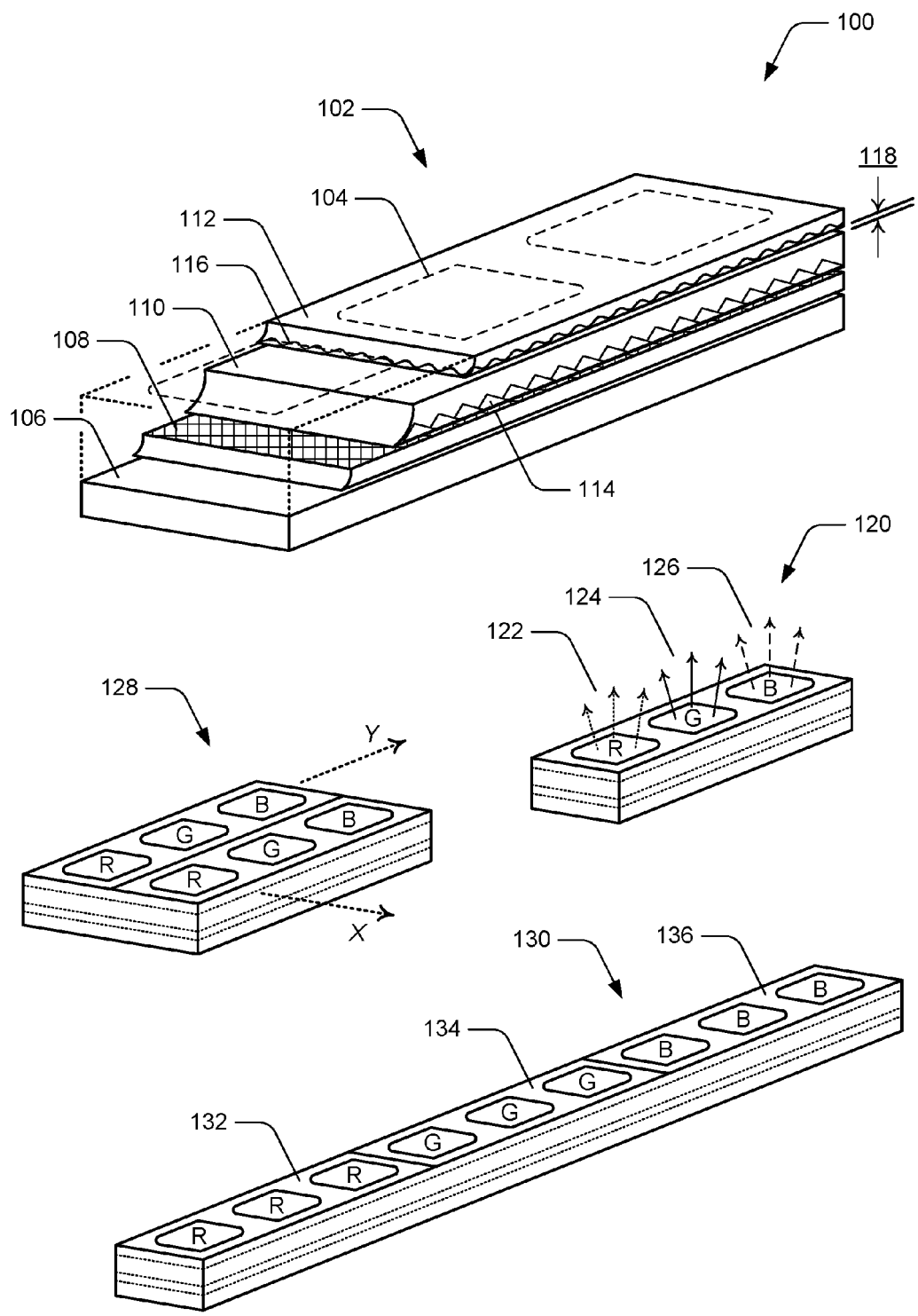
FIG. 1 illustrates examples of imaging structures with embedded light sources in accordance with one or more embodiments.

FIG. 1 illustrates examples 100 of an imaging structure with embedded light sources in accordance with one or more embodiments. An imaging structure 102, similar to a transistor array, has material layers that form the embedded light sources 104 of the imaging structure to directly emit light. For example, inorganic LED (iLED) material can be utilized that produces greater luminescence than typical OLED micro-display solutions which are principally limited to low light scenarios. However, embodiments of imaging structure emitter calibration can be implemented for OLED micro-display solutions. In this example 100, the imaging structure 102 is constructed with a silicon backplane layer 106, a driver pad array 108, an emitter material layer 110, and a conductive material layer 112 that may be implemented as a common layer or pixel specific layer that is transparent, a ground plane, a metal layer, a power conductive layer, and/or as another type of material or configuration of materials.

The embedded light sources 104 are formed as individual emitters on the driver pad array in the emitter material layer, and the embedded light sources can be individually controlled at the driver pad array. The emitter material layer 110 can include a reflective structure 114, such as formed in a reflective array that is embedded or etched, for LED pixel isolation and reflective collection of photons (e.g., pseudo parabolic collection) towards an ideal light exit plane. The emitter material layer includes the reflective structure 114 to reflect the light to exit the individual direct emitters. Alternatively or in addition to the reflective structure 114, the imaging structure 102 can include other techniques, such as pyramid and/or cylindrical structures, to improve the optical extraction of the light. Implementations of color conversion may also be applied to the surfaces of the reflective, pyramid, and/or cylindrical structures.

The conductive material layer 112 can be formed with a rough surface 116 that is designed to allow more light emission out from the emitter material layer rather than be reflected or dispersed. Additionally, the material used to form the conductive material layer 112 can be formed around the sides of the individual LED zones. In embodiments, a p-n junction 118 is formed between the emitter material layer 110 and the conductive material layer, where one of the emitter material layer or the conductive material layer is a p-type semiconductor and the other is an n-type semiconductor. The conductive material layer 112 can be implemented as a transparent, common ground plane at the top of the imaging structure for electron flow through the p-n junction 118 as a transparent conductor. Alternatively, two separate layers with an insulation layer can be implemented to allow reflection on a lower layer with no connectivity, and allow reflection on an upper layer with connectivity.

In the imaging structure 102, multiple points between the p-type and the n-type semiconductor materials can be connected (e.g., strapped) for overall efficiency and to improve conductance. The imaging structure is unique for LEDs in that light is not emitted over the whole surface of the imaging structure. For micro-lens efficiency, point source emission can be implemented, and the emitting area can be well under 50% (e.g., such as 10%). Accordingly, the conductive material layer 112 may not be implemented as transparent conductor material, but rather as metal around the emitting area to strap down the p-type material to ground. Alternatively or in addition, TSV-like channels can be utilized to the top of the p-type material for either a pixel driver or for ground. When the structures are implemented as diodes, and depending on which way the p-n junction is layered and how the ground and active are wired, various configurations can be implemented.

In embodiments, the imaging structure 102 can be implemented as inorganic LEDs (iLEDs) on the silicon backplane layer 106 to drive line-scanned or pico-projection devices without using an additional LCOS imager. The imaging structure is also implemented for per-pixel color illumination (rather than full-display) for illumination efficiency and minimal light loss. The imaging structure 102 can be implemented with red, green, and/or blue (RGB) embedded light sources, such as lasers or LEDs, in various one-dimensional (1D), two-dimensional (2D), or n-dimensional arrays, structures, and configurations. Alternatively, the imaging structure 102 can be implemented with OLEDs (formed from organic material) in various one-dimensional (1D), two-dimensional (2D), or n-dimensional arrays of the embedded light sources.

For example, a 1D array imaging structure 120 is formed with red 122, green 124, and blue 126 embedded light sources (e.g., iLEDs or lasers) that are formed with different materials for each different color. In another example, a 2D array imaging structure 128 is formed with two each RGB embedded light sources, and as indicated, may include additional embedded light sources along an X and/or Y axis of the 2D array. In embodiments of imaging structure emitter calibration, a 2D array of embedded light sources can formed with OLEDs or iLEDS. In an example implementation, a 2D array of embedded light sources can include a blue array from blue LED material, a red array from red LED material, and a green array from green LED material. In other embodiments, the imaging structure 102 can be formed as base structure with one material in a single color, such as blue, and then a color conversion layer can be utilized over the imaging structure to convert green and red from the blue base.

The silicon backplane layer 106 of the imaging structure 102 receives serial or parallel data which is used to drive associated pixels, such as for example, at speeds of 30 Hz to 60 Hz, or at faster frame rates. In alternate configurations, the imaging structure 102 may be implemented without the silicon backplane layer 106, in which case the embedded light sources can be initiate passively with data and select lines, such as driver by line driver chips (similar to those used in display devices, for example). In a 1D configuration (e.g., the 1D array imaging structure 120), an image is generated over time by driving a line of pixels x-number of times per frame. Alternatively, sets of lines can be driven to generate a frame of an image, or entire frames of the image, at one time. Any of the various arrays and configurations can be selected based on intended light levels, timing to scan lines, and illumination efficiency.

Each of the embedded light sources can be individually controlled by the driver pad array 108 (also referred to as the control plane), and can be illuminated in a variety of patterns based on analog, current modulation, pulse-width modulation (PWM), and/or based on specific time and power parameters. The iLED, OLED, or laser arrays then generate either multiple colors (1D×RGB or 2D×RGB) or single color (UV or blue) with additional color conversion layers, which may include a layer of Quantum Dots (QDs). An additional, optional layer or set of layers can be implemented to leverage LC (liquid crystal) materials to direct, redirect, and/or focus the light that is emitted from the imaging structure array. In embodiments, the embedded light sources are implemented as lasers with a surface emitting laser array or a VCSEL (vertical-cavity surface-emitting laser). An example implementation may include LED material in the center of multiple Bragg reflective layers at one-quarter wavelength apart, and the LEDs create the initial photons that lase in a chamber formed by the Bragg layers.

The driver pad array 108 is implemented for current-based modulation (rather than a voltage-based LCOS) to drive the individual embedded light sources, such as iLEDs or lasers (rather than previously utilized LC material). The driver pad array 108 can have exposed metal pads to directly drive the LED array electrically (e.g., a current-based LED drive) and optically (e.g., an exposed metal pad utilized as a reflector). The connections from the driver pad array 108 to the emitter material layer 110 can be implemented by various techniques, such as TSV (through-silicon via), as deposited material, or layered 1D or 2D iLED structures on top of the control plane (e.g., the driver pad array 108), where the pixels are the rows or grids of the iLEDs. These connections allow control of voltage and/or current for controlling light illumination from the imaging structure array.

An example imaging structure 130 can be implemented as a fault tolerant array used to avoid yield loss of illumination when single pixel zones fail. The imaging structure 130 is formed as an array of nine embedded light sources (e.g., iLEDs) in three sections, with three red 132, three green 134, and three blue 136 embedded light sources. After production, a test can be used to determine weak or faulty light source sectors, which can then be marked for non-use in a final LED scan controller. Additionally, if one embedded light source of a section fails, the illumination intensity of the other two embedded light sources in the section can be increased, such as with gamma correction for non-linear illumination, to calibrate for the failed light source.

Other imaging structure configurations can also be utilized as a fault tolerant array, such as with two pixels per sub-pixel (e.g., a 2D array of six embedded light sources with two red, two green, and two blue embedded light sources), or an array of embedded light sources with more than three pixels per color. Other imaging structure configurations can be implemented with multiple sets of LED arrays that are positioned, or otherwise fit, extremely close to one another to avoid having multiple LEDs per pixel. Any number of configuration patterns are also possible, such as a 2D array, four square blocks, a 2×4 configuration, or any other n×m configuration that allows for smaller array yields.

Figure 2:
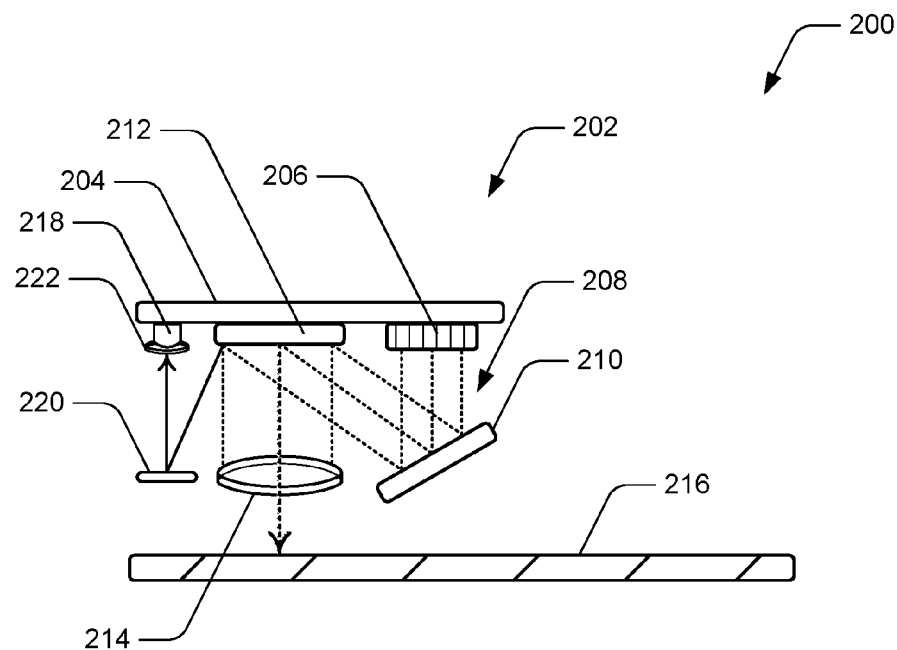
FIG. 2 illustrates examples of imaging units in accordance with one or more embodiments of imaging structure emitter calibration.
Figure 2:
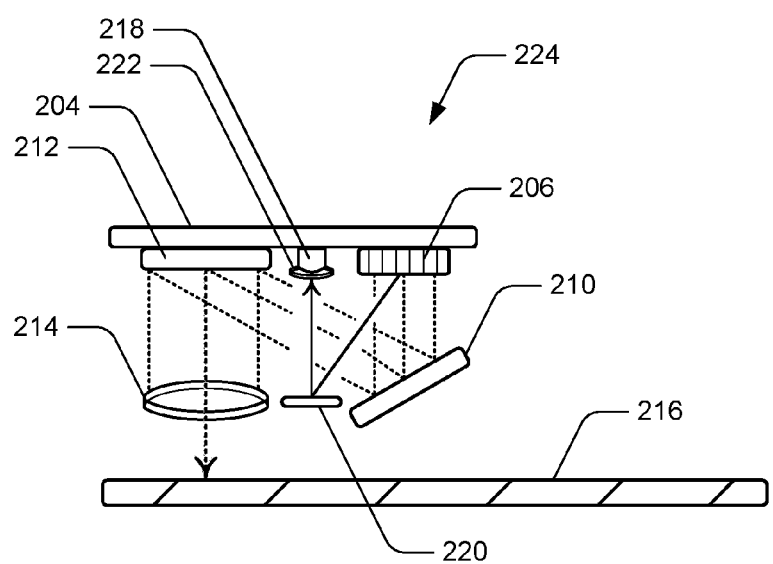

FIG. 2 illustrates examples 200 of imaging units in embodiments of imaging structure emitter calibration. An imaging unit 202 includes a printed circuit board 204 that incorporates an emitter structure 206 (also referred to herein as an imaging structure). The emitter structure 206 can be implemented as any of the example imaging structures described with reference to FIG. 1, such as the one-dimensional imaging structure 120 with RGB embedded light sources, or as the example two-dimensional imaging structure 128. As noted, the emitter structure 206 can be implemented with lasers, iLEDs, or OLEDs in various one-dimensional (1D), two-dimensional (2D), or n-dimensional arrays of the embedded light sources. The emitter structure can be implemented as individually controlled embedded light sources that direct emit the light 208, and the individual embedded light sources cycle to direct emit the light one at a time. In implementations, the embedded light sources are formed in inorganic material as one of lasers or iLEDs to direct emit the light, such as described with reference to FIG. 1. The lasers and LEDs tend to operate at far higher speeds than the pixel rates that may be used, which can allow testing over a range of emissions. The array of emitters (e.g., the embedded light sources) are modulated based on position of a scanning mirror, or similar implementation.

The imaging unit 202 includes optics that direct the light along a light path in the imaging unit. For example, the emitter structure 206 direct emits the light, which is reflected by a reflecting mirror 210 to illuminate a projection surface 212, such as a MEMS scanning mirror (e.g., or other electrically alterable mirror) that is also incorporated with the printed circuit board 204. The imaged light is then directed by the projection surface through an imaging optic 214 that directs the light into a display optic 216, such as a see-through, reflecting waveguide. The light emitted from the emitter structure (e.g., lasers or iLEDs) is directed into an emission cone, and the light diverges to the projection lens, which then collimates the beam to form a virtual object for viewing, such as for a wearable display device or other near-to-eye display.

In embodiments, the imaging unit 202 also includes a light sensor 218 that is positioned proximate the projection surface 212 in the imaging unit. A reflective panel 220, such as a Fresnel mirror, is positioned to reflect a portion of the light at a collection lens 222 to illuminate the light sensor. The Fresnel mirror can include facets that direct the light to the detector, and the signal on the calibration sensor (e.g., the light sensor) is then used to calibrate each emitter in the array. In implementations, the light sensor may be a linear array of light detectors positioned along one or more edges of the projection surface 212. In other implementations, the light sensor can be positioned anywhere in the imaging unit 202 for an optical view of the emitter structure 206.

Alternatives to the reflective panel 220 (e.g., a Fresnel mirror) that directs the light to illuminate the light sensor 218 can be implemented to collect the light. For example, the light can be detected from the display optic 216 (e.g., a waveguide) when the light is sensed from one LED pixel of the emitter structure 206 at a time, and/or from one or more partially reflecting (non-100%) mirrors implemented in the light path. Other techniques may also be implemented to sense the light output from the embedded light sources of the emitter structure, such as with sensors that are positioned outside of the projection or light guide system. In other implementations of imaging structure emitter calibration, quantum dots (QDs), such as an IR QD, may be implemented to convert some of the light to IR to be detected by an IR detector. For example, larger QDs (like 10 nm) will have a wide input wavelength capability, and an emitter can be converted to a single receiver when the light that is generated within the emitter structure array can be detected at the position of the detector.

Other sensors for ambient light, temperature, brightness of the image that is being presented, etc. can also be used in conjunction with the light emission measurements at the light sensor, and global corrections can be applied. For example, the effects of temperature on the emitter structure can be measured to form global corrections per device or imaging unit. Further, one or more individual emitters (e.g., embedded light sources) can be tested concurrently depending on the type of sensor implementation.

As shown in the imaging unit 202, the light sensor 218 is positioned at an outside edge of the projection surface 212 and incorporated with the printed circuit board 204. In an alternate embodiment, an imaging unit 224 includes the light sensor 218 positioned between the projection surface 212 and the emitter structure 206. To avoid a loss of display surface, the areas outside of the display area are used, but leverage areas within the limits of the scan device. A MEMS (or similar systems) may have dead areas at the ends of the scan where scan speeds are less deterministic. Implementations of imaging structure emitter calibration utilize sensors with far greater size than the pixel sizes, which allows for calibration in these dead zones.

As described with reference to FIGS. 3 and 4, a wearable display device (e.g., glasses or a head-mounted display) can be implemented with left and right display lens systems that each include an embodiment of an imaging unit, such as the imaging unit 202 or the imaging unit 224. The wearable display device and/or a controller unit of the wearable display device implements an imaging application, such as a software application, to implement embodiments of imaging structure emitter calibration as described herein. Examples of controller units that can implement an imaging application for a wearable display device are described with reference to FIG. 4.

In embodiments, the imaging application is implemented to receive sensor data from the light sensor 218, or from a linear array of light detectors, where the sensor data corresponds to the emitted light output from the emitter structure (e.g., an array of embedded light sources). The imaging application can then compute a correction value for each of the individual embedded light sources of the emitter structure over a time duration, and initiate a calibration input to the emitter structure to adjust the emitted light output for each individual embedded light source. The calibration input adjusts the emitted light output from the individual embedded light sources, and also corrects for environment and/or operational conditions that affect the emitted light output from the emitter structure, such as temperature, ambient light, and other environmental or operational conditions. A calibration of the emitter structure 206 can also be implemented during manufacturing to determine initial parameters for offsets based on distance to detector or optical differences. This provides the post-manufacturing calibration process with a basis for differences in the specific device for on-going, post-manufacturing calibrations.

In a one-dimensional line-scanning example, an array of emitters, such as 1024 embedded light sources in the emitter structure 206, can be scanned over 1280 discrete positions to create a 1280×1024 pixel solution. An array of nine emitters, such as the imaging structure 130 shown in FIG. 1 with nine emitters (e.g., three red, three green, and three blue embedded light sources) per pixel may have only two of the three emitters per color operational as determined after manufacturing. The light sensor 218 can be illuminated during the traditional dead time that the mirror or other mechanism is turning direction. For example, a simple three color sensor can be implemented for the example three-sub pixels emitter structure. Larger sensor sizes can also be implemented for multiple emitter testing. Alternatively or in addition, multiple sensors may be implemented, such as on both sides of the projection surface 212 to reduce calibration times. In implementations, the light emission from the emitter structure 206 is measured by the sensor per color, but other sensor types can also be used to include other measurements for color accuracy, blur, etc.

Continuing the example implementation, a single emitter set of all three colors can be turned on to emit light with a modulated pattern in the dead time, and sequence through each pixel in the scan row every time the scan array reaches the dead zone where the sensor is placed. Accordingly, calibration in this example can be 1024 sequences of the scan array to obtain values from every pixel. Assuming a 60 Hz system and a sensor on one side of the projection surface, it may take 1024/30 seconds to obtain a value for every pixel, which is well within acceptable calibration times. The sensor data is received by the imaging application, and a modulated test signal represents a sequence of emission values that are used for a correction curve (e.g., fully analog, piece-wise linear, or discrete points) to adjust the emitted light output for each individual emitter of the emitter structure. For emitters that have failed in fault tolerant solutions, combinations of emitters per color per pixel can be used, and follow-up testing when failures are found can be used. Embodiments of imaging structure emitter calibration provides for initial testing of the emitters followed with any sequence of specific testing to generate a more accurate correction or curve per pixel.

Figure 3:
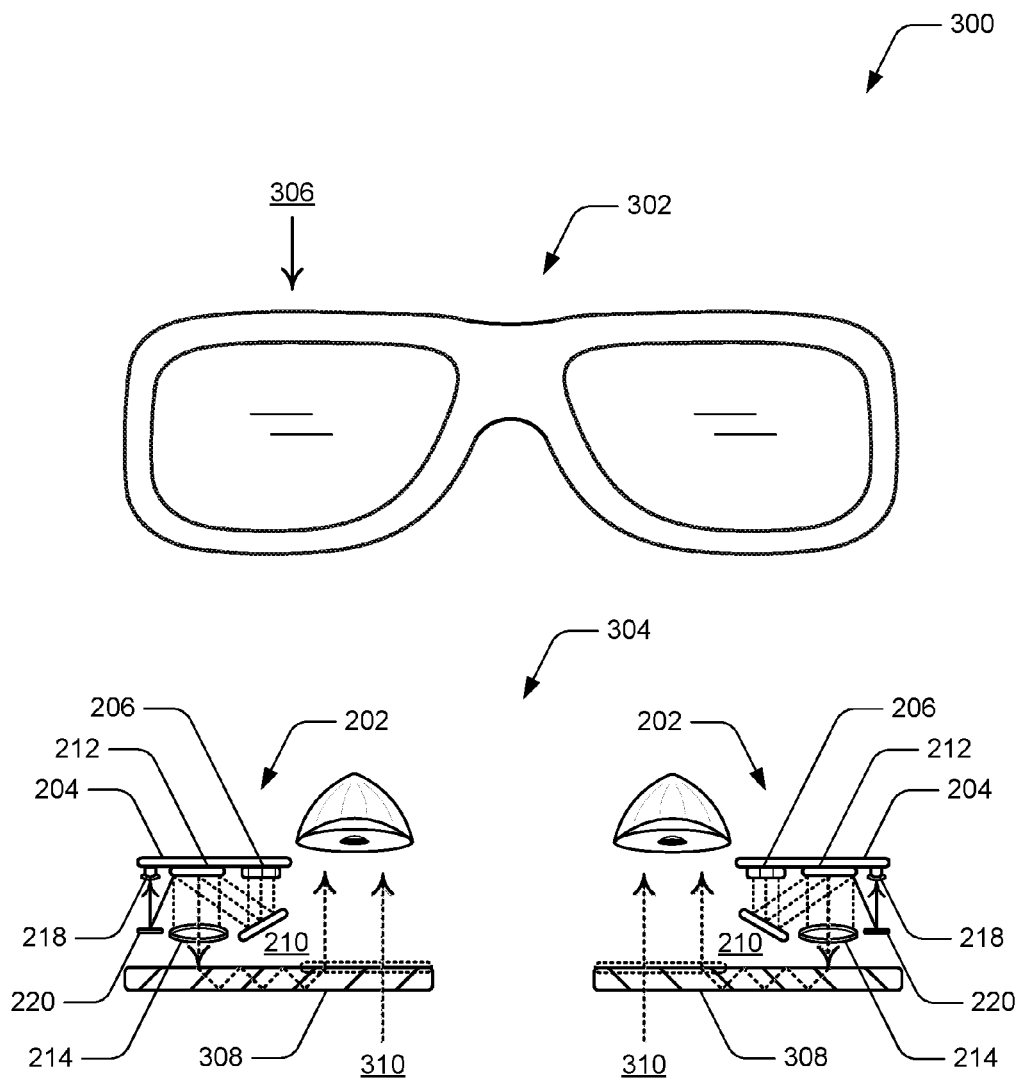
FIG. 3 illustrates an example system in which embodiments of imaging structure emitter calibration can be implemented.

FIG. 3 illustrates an example system 300 in which various embodiments of imaging structure emitter calibration can be implemented. An example wearable display device 302 includes left and right display lens systems, such as display lens systems 304 that are viewed from a perspective 306 of the wearable display device, as if viewing the display lens systems from the top of the device. In embodiments, the display lens systems 304 can be implemented as left and right display lens systems of the wearable display device described with reference to FIG. 4. A wearable display device can be implemented as any type of glasses or head-mounted display (HMD) that includes implementations of the display lens systems 304 (e.g., left and right display lens systems) through which a user can view the surrounding environment, yet also see virtual images that are generated for display and appear as a part of the environment. References to a left imaging system and a right imaging system, as described herein, correlate to a user's left and right eyes (e.g., from the perspective of wearing and looking through the wearable display device). Alternatively, the left and right imaging systems may be described from the perspective of looking at the wearable display device.

The display lens systems 304 include a display optic 308, such as a see-through and reflecting waveguide, through which light 310 of an image (e.g., an image of the environment as viewed through the wearable display device) is projected for viewing. In this example, the display lens systems 304 include examples of the imaging unit 202 (as shown in FIG. 2), which can be implemented with any number of micro display panels, imaging structures with direct emitters, lenses, and reflecting elements to display and project a virtual image into a see-through and reflecting waveguide. Alternatively, the display lens systems 304 can be implemented with the example imaging unit 224, or other imaging unit configurations. The see-through, reflecting waveguide (i.e., the display optic 308) is implemented for internal reflection and conducts visible light of a virtual image that is generated by the imaging unit 202 for viewing by a user, and also passes through the light 310 from the surrounding environment for viewing by the user. A display lens system 304 with an imaging unit can also be implemented with components of the display lens system described with reference to FIG. 4 to implement embodiments of imaging structure emitter calibration.

In embodiments, the imaging units 202 of the display lens systems 304 each include the printed circuit board 204 that incorporates the emitter structure 206, such as the one-dimensional imaging structure 120 (described with reference to FIG. 1) with RGB embedded light sources, or the example two-dimensional imaging structure 128. The emitter structure 206 direct emits the light, which is reflected by the reflecting mirror 210 to illuminate the projection surface 212, such as a MEMS scanning mirror (e.g., or other electrically alterable mirror) that is also incorporated with the printed circuit board 204. The imaged light is then directed by the projection surface through the imaging optic 214 that directs the light into the display optic 308. The imaging unit 202 also includes the light sensor 218 that is positioned proximate the projection surface 212 in the imaging unit. The reflective panel 220, such as a Fresnel mirror, is positioned to reflect a portion of the light at the collection lens to illuminate the light sensor.

Figure 4:
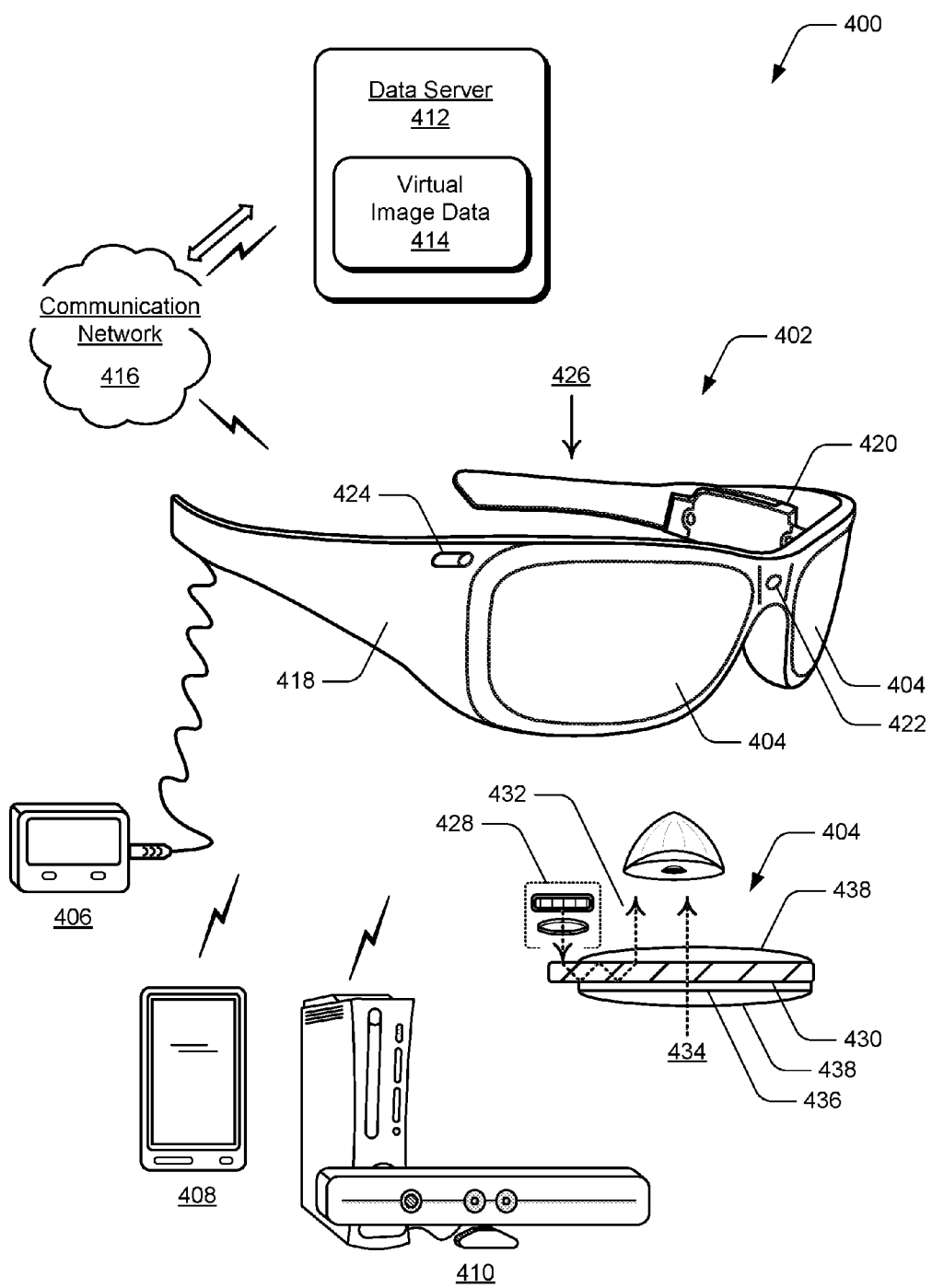
FIG. 4 illustrates an example system that includes an example of a wearable display device in which embodiments of imaging structure emitter calibration can be implemented.

FIG. 4 illustrates an example system 400 that includes an example wearable display device 402 in which embodiments of imaging structure emitter calibration can be implemented. The wearable display device can be implemented as any type of glasses or head-mounted display (HMD) that includes display lens systems 404 (e.g., left and right display lens systems) through which a user can view the surrounding environment, yet also see virtual images (e.g., any type of object, video, text, graphic, and the like) that are generated for display and appear as a part of the environment.

The wearable display device 402 can be implemented as an independent, portable system that includes memory, software, a processor, and/or a power source. Alternatively or in addition, the wearable display device may be communicatively linked to a controller 406 that includes any one or combination of the memory, software, processor, and/or power source, such as a battery unit. The controller can be implemented for wired or wireless communication with the wearable display device. The controller and/or the wearable display device can also be implemented with any number and combination of differing components as further described with reference to the example device shown in FIG. 6. For example, the controller and/or the wearable display device includes an imaging application implemented as computer-executable instructions, such as a software application, and executed by a processor to implement embodiments of imaging structure emitter calibration as described herein.

In embodiments, the controller may be implemented as a dedicated device (e.g., the wired controller 406), as a mobile phone 408, a tablet or other portable computer device, a gaming system 410, or as any other type of electronic device that can be implemented to process and generate virtual images for display as part of the environment that is viewed through the display lens system of the wearable display device. The controller may communicate with the wearable display device wirelessly via WiFi™, Bluetooth™, infrared (IR), RFID transmission, wireless Universal Serial Bus (WUSB), cellular, or via other wireless communication techniques.

The example system 400 also includes a data server 412, or data service, that communicates, or otherwise distributes, virtual image data 414 to the wearable display device 402 via a communication network 416. For example, the data server may be part of a network-based gaming system that generates virtual images for augmented reality display at the wearable display device. Alternatively, the data server may be part of a navigation system that communicates navigation directions and information for display in the display lens systems 404 of the wearable display device. In another example, the data server may be part of a messaging service, such as an e-mail or text messaging system, that communicates e-mail and/or text messages to the wearable display device for display in the display lens systems, where a user can read a message as an augmented reality image that is displayed over the environment viewed through the wearable display device.

Any of the devices, servers, and/or services can communicate via the communication network 416, which may be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider.

The wearable display device 402 includes a frame 418, such as in the form of glasses, goggles, or any other structure, that supports and incorporates the various components of the device, as well as serves as a conduit for electrical and other component connections. A components module 420 (or components modules on the left, right, and/or both sides of the device frame) incorporates any of the various components, such as processing and control circuitry, memory, software, a processor, GPS transceiver, and/or power source. The wearable display device may also include a microphone 422 to record audio data from the surrounding environment, as well as ear phones for audio feedback as part of an augmented reality experience.

The wearable display device 402 also includes various cameras 424 that capture video and still images of the surrounding environment. The image and video data can be processed on the device and/or by a controller device (e.g., controller 406), and used to create a mapping field to orient and track a user in the environment space. The wearable display device can also include eye tracking cameras used to determine a user's eyeball location and track eye movements. The wearable display device may also include a temperature sensor, as well as inertial sensors and/or attitude sensors, including MEMS gyros, magnetic sensors (e.g., a compass), and acceleration sensors for sensing position, orientation, and acceleration of the wearable display device.

An example of one display lens system 404 is shown from a viewer perspective 426 of the wearable display device 402, as if viewing the display lens system from the top of the device. The display lens system includes an imaging system 428, which can be implemented with any number of micro display panels, lenses, and reflecting elements to display and project a virtual image into a see-through and reflecting waveguide 430. A display lens system 404 can also be implemented as the imaging units described with reference to FIG. 3 to implement embodiments of imaging structure emitter calibration. The see-through, reflecting waveguide 430 is implemented for internal reflection and conducts the visible light 432 of a virtual image that is generated by the imaging unit for viewing by a user, and also passes through the light 434 from the surrounding environment for viewing by the user.

The micro display panels, lenses, and/or reflecting elements of the imaging system 428 can be implemented with various display technologies, such as implemented with a transparent LCD, or using a transmissive projection technology where the light source is modulated by optically active material, backlit with white light. These technologies can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material.

In embodiments, the imaging system 428 (or other components of a display lens system 404) can be implemented to include an infra-red (IR) laser utilized for system calibrations and/or as an illumination source for an eye-tracking system and camera that tracks the position of a user's eyes. The eye-tracking system includes the eye-tracking illumination source, which is not a visible light, and includes an eye-tracking IR sensor. In implementations that include color conversion, the illumination source can be implemented as UV or blue iLED arrays, and a color conversion implemented to emit IR light from one or more of the pixels. The IR sensor can be implemented as an IR camera that provides infrared image data of the eye for eye-tracking processing, or an IR sensor that detects eye reflections when the eye is illuminated. Alternatively or in addition, sensors can be implemented in the CMOS driver array to detect the feedback. In implementations, the light reflections (e.g., the IR return) may be directed with SBG or SRB methods. The see-through and reflecting waveguide 430 can also be utilized for the infrared illumination, and for eyeball reflections that the eye-tracking system uses to track the position of the user's eyes.

In this example, the display lens systems 404 include an optional opacity filter 436, and a see-through lens 438 on each side of the waveguide 430. The see-through lenses can be standard eye-glass lenses and made to prescription (or no prescription). The opacity filter selectively blocks natural light, either uniformly or on a per-pixel basis, from passing through the see-through and reflecting waveguide to enhance the contrast of a displayed virtual image.

Example method 500 is described with reference to FIG. 5 in accordance with one or more embodiments of imaging structure emitter calibration. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 5:
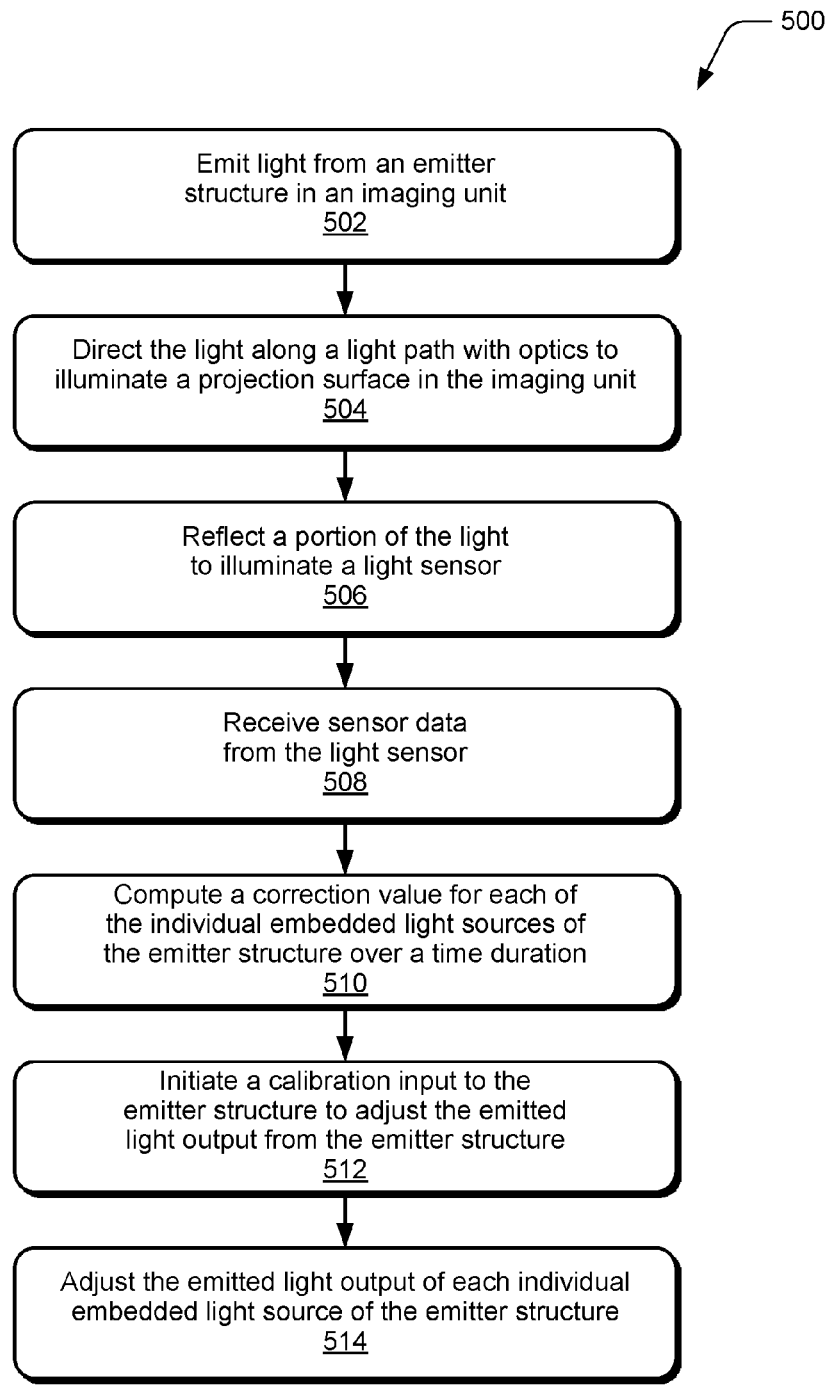
FIG. 5 illustrates example method(s) of imaging structure emitter calibration in accordance with one or more embodiments.

FIG. 5 illustrates example method(s) 500 of imaging structure emitter calibration. The order in which the method blocks are described are not intended to be construed as a limitation, and any number of the described method blocks can be combined in any order to implement a method, or an alternate method.

At block 502, light is emitted from an emitter structure in an imaging unit. For example, the imaging unit 202 (FIG. 2) includes the emitter structure 206, which can be implemented as individual embedded light sources that direct emit light, and the individual embedded light sources cycle to direct emit the light one at a time. At block 504, the light is directed along a light path with optics to illuminate a projection surface in the imaging unit. For example, the optics in the imaging unit 202, such as the reflecting mirror 210, directs the light along a light path to illuminate the projection surface 212.

At block 506, a portion of the light is reflected to illuminate a light sensor. For example, the reflective panel 220 in the imaging unit 202 reflects a portion of the light at the collection lens 222 to illuminate the light sensor 218. In implementations, the light sensor may be a linear array of light detectors positioned along one or more edges of the projection surface 212. At block 508, sensor data is received from the light sensor. For example, an imaging application 624 (shown in FIG. 6) receives the sensor data 616 from the light sensor 218, where the sensor data corresponds to the emitted light output from the emitter structure. In implementations, the sensor data is received from a linear array of the light detectors.

At block 510, a correction value is computed for each of the individual embedded light sources of the emitter structure over a time duration. For example, the imaging application 624 computes a correction value for each of the individual emitters (e.g., embedded light sources) of the emitter structure 206. At block 512, a calibration input to the emitter structure is initiated to adjust the emitted light output from the emitter structure and, at block 514, the emitted light output is adjusted for each individual embedded light source of the emitter structure. For example, the imaging application 620 initiates the calibration input for each of the individual embedded light sources to adjust the emitted light output. Further, the calibration input corrects for operational conditions that affect the emitted light output from the emitter structure, such as temperature, ambient light, and other environmental or operational conditions.

Figure 6:
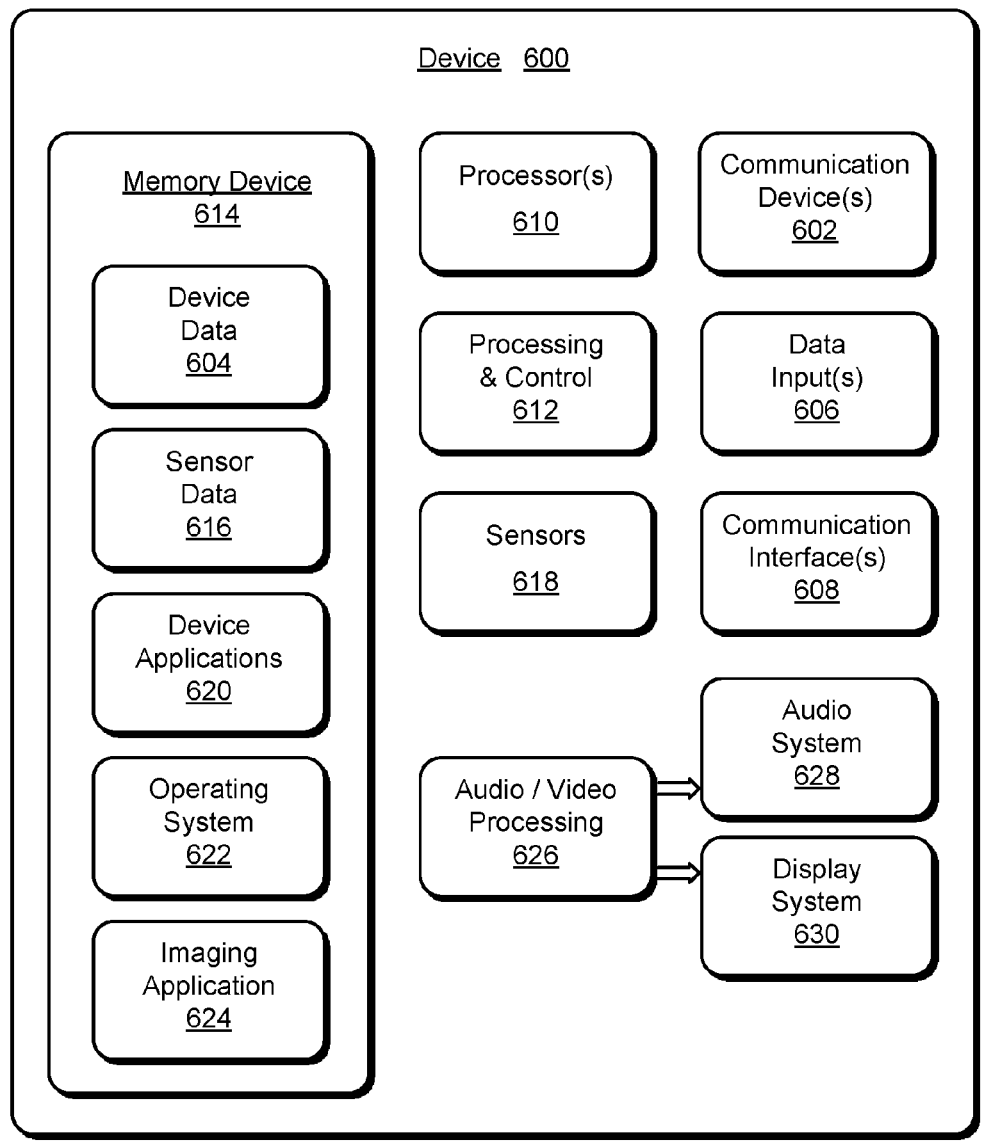
FIG. 6 illustrates various components of an example device that can implement embodiments of imaging structure emitter calibration.

FIG. 6 illustrates various components of an example device 600 that can be implemented as any of the devices described with reference to the previous FIGS. 1-5, such as a wearable display device and/or a controller for a wearable display device. In embodiments, the device may be implemented as any one or combination of a fixed or mobile device, in any form of a consumer, computer, portable, communication, phone, mavigation, appliance, gaming, media playback, and/or electronic device. The device may also be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as virtual image data, as well as video and images data, and other media content stored on the device. The media content stored on the device can include any type of audio, video, and/or image data. The device includes one or more data inputs 606 via which any type of data, media content, and/or inputs can be received, such as user-selectable inputs and any other type of audio, video, and/or image data received from any content and/or data source.

The device 600 also includes communication interfaces 608, such as any one or more of a serial, parallel, network, or wireless interface. The communication interfaces provide a connection and/or communication links between the device and a communication network by which other electronic, computing, and communication devices communicate data with the device.

The device 600 includes one or more processors 610 (e.g., any of microprocessors, controllers, and the like) or a processor and memory system (e.g., implemented in an SoC), which process computer-executable instructions to control the operation of the device. Alternatively or in addition, the device can be implemented with any one or combination of software, hardware, firmware, or fixed logic circuitry that is implemented in connection with processing and control circuits which are generally identified at 612. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 614 provides data storage mechanisms to store the device data 604, sensor data 616 from calibration sensors 618, other types of information and/or data, and device applications 620. For example, an operating system 622 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include an imaging application 622 that may implement embodiments of imaging structure emitter calibration as described herein.

The device 600 may also include an audio and/or video processing system 626 that generates audio data for an audio system 628 and/or generates display data for a display system 630. In implementations, the audio system and/or the display system are external components to the device. Alternatively, the audio system and/or the display system are integrated components of the example device.

Although embodiments of imaging structure emitter calibration have been described in language specific to features and/or methods, the appended claims are not necessarily limited to the specific features or methods described. Rather, the specific features and methods are disclosed as example implementations of imaging structure emitter calibration.

The invention claimed is:

1. A wearable display device, comprising:
left and right display lens systems configured for augmented reality imaging;
left and right imaging units of the respective left and right display lens systems configured to generate an augmented reality image, each of the left and right imaging units comprising:
an emitter structure configured to direct emit light;
optics configured to direct the light along a light path in the imaging unit;
a projection surface that the optics direct the light along the light path to illuminate, the projection surface being an electrically alterable mirror configured to scan in at least one dimension to reflect the light through an imaging optic that directs the light into a display optic; and
a reflective panel configured to reflect a portion of the light directed by the projection surface to illuminate a light sensor, the reflective panel positioned proximal to the imaging optic allowing the portion of the light to be reflected at a beginning position or an end position of the scan in the at least one direction of the projection surface.

2. The wearable display device as recited in claim 1, further comprising an imaging application configured to receive sensor data from the light sensor, the sensor data corresponding to emitted light output from the emitter structure.

3. The wearable display device as recited in claim 2, wherein the light sensor comprises a linear array of light detectors, and wherein the imaging application is configured to receive the sensor data from the linear array of light detectors.

4. The wearable display device as recited in claim 1, further comprising an imaging application configured to initiate a calibration input to the emitter structure to adjust emitted light output from the emitter structure.

5. The wearable display device as recited in claim 4, wherein the emitter structure comprises individual embedded light sources configured to direct emit the light, and wherein the calibration input adjusts the emitted light output from an individual embedded light source of the emitter structure.

6. The wearable display device as recited in claim 5, wherein the imaging application is configured to compute a correction value for each of the individual embedded light sources of the emitter structure over a time duration.

7. The wearable display device as recited in claim 4, wherein the calibration input to the emitter structure corrects for operational conditions that affect the emitted light output from the emitter structure.

8. A method implemented by a wearable display device, the method comprising:
generating an augmented reality image with left and right display lens systems of the wearable display device, each of the left and right display lens systems:
directing light along a light path with optics to illuminate a projection surface that is an electrically alterable mirror configured to scan in at least one dimension to reflect the light through an imaging optic that directs the light into a display optic;
a reflective panel reflecting a portion of the light directed by the projection surface with a reflective panel to illuminate a light sensor that generates sensor data corresponding to emitted light output from an emitter structure, the reflective panel positioned proximal to the imaging optic allowing the portion of the light to be reflected at a beginning position or an end position of the scan in the at least one direction of the projection surface; and
calibrating the emitter structure to adjust the emitted light output from the emitter structure.

9. The method as recited in claim 8, wherein the light sensor comprises a linear array of light detectors.

10. The method as recited in claim 8, further comprising:
receiving the sensor data from each light sensor of the respective display lens systems; and
generating a calibration input to the emitter structure in each of the respective display lens systems to adjust the emitted light output from the emitter structures.

11. The method as recited in claim 10, further comprising correcting for operational conditions that affect the emitted light output from the emitter structure with the calibration input to the emitter structure.

12. The method as recited in claim 10, wherein the emitter structure comprises individual embedded light sources configured to direct emit the light, and the method further comprising adjusting the emitted light output from an individual embedded light source of the emitter structure based on the calibration input.

13. The method as recited in claim 12, further comprising computing a correction value for each of the individual embedded light sources of the emitter structure over a time duration.

14. A wearable display device, comprising:
left and right display lens systems configured to generate an augmented reality image, each of the left and right display lens systems comprising:
an emitter structure configured to direct emit light that is directed along a light path with optics in the display lens system;
a projection surface illuminated by the light directed along the light path, the projection surface being an electrically alterable mirror configured to scan in at least one dimension to reflect the light through an imaging optic that directs the light into a display optic; and
a reflective panel configured to reflect a portion of the light directed by the projection surface to illuminate a light sensor, the reflective panel positioned proximal to the imaging optic allowing the portion of the light to be reflected at a beginning position or an end position of the scan in the at least one direction of the projection surface.

15. The wearable display device as recited in claim 14, further comprising an imaging application configured to receive sensor data from the light sensor, the sensor data corresponding to emitted light output from the emitter structure.

16. The wearable display device as recited in claim 15, wherein the light sensor comprises a linear array of light detectors, and wherein the imaging application is configured to receive the sensor data from the linear array of light detectors.

17. The wearable display device as recited in claim 14, further comprising an imaging application configured to initiate a calibration input to the emitter structure to adjust emitted light output from the emitter structure.

18. The wearable display device as recited in claim 17, wherein the emitter structure comprises individual embedded light sources configured to direct emit the light, and wherein the calibration input adjusts the emitted light output from an individual embedded light source of the emitter structure.

19. The wearable display device as recited in claim 18, wherein the imaging application is configured to compute a correction value for each of the individual embedded light sources of the emitter structure over a time duration.

20. The wearable display device as recited in claim 17, wherein the calibration input to the emitter structure corrects for operational conditions that affect the emitted light output from the emitter structure.

* * * * *